(12) United States Patent
Lee et al.

(10) Patent No.: US 11,240,685 B2
(45) Date of Patent: Feb. 1, 2022

(54) DEVICES AND METHODS OF SELECTING SIGNAL PROCESSING ALGORITHM BASED ON PARAMETERS

(71) Applicant: Samsung Electronics Co., Ltd., Suwon-si (KR)

(72) Inventors: Jun-ho Lee, Hwaseong-si (KR); In-yup Kang, San Diego, CA (US); Young-seok Jung, Suwon-si (KR); Min-goo Kim, Hwaseong-si (KR); In-hyoung Kim, Yongin-si (KR); Ki-joon Hong, Hwaseong-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 140 days.

(21) Appl. No.: 16/249,007

(22) Filed: Jan. 16, 2019

(65) Prior Publication Data

US 2019/0239098 A1 Aug. 1, 2019

(30) Foreign Application Priority Data

Jan. 29, 2018 (KR) .................. 10-2018-0010848
Aug. 27, 2018 (KR) .................. 10-2018-0100570

(51) Int. Cl.
| | |
|---|---|
| *H04W 24/08* | (2009.01) |
| *H04W 24/02* | (2009.01) |
| *H04W 72/04* | (2009.01) |
| *H04L 25/02* | (2006.01) |
| *H04L 12/26* | (2006.01) |
| *H04B 17/336* | (2015.01) |
| *H04W 88/10* | (2009.01) |
| *H04L 12/727* | (2013.01) |

(52) U.S. Cl.
CPC ........ *H04W 24/02* (2013.01); *H04L 25/0202* (2013.01); *H04W 24/08* (2013.01); *H04W 72/0473* (2013.01); *H04B 17/336* (2015.01); *H04L 43/0852* (2013.01); *H04L 45/121* (2013.01); *H04W 88/10* (2013.01)

(58) Field of Classification Search
None
See application file for complete search history.

(56) References Cited

U.S. PATENT DOCUMENTS

| | | |
|---|---|---|
| 6,169,884 B1 | 1/2001 | Funk |
| 7,698,578 B2 | 4/2010 | Williams et al. |
| 8,548,475 B2 | 10/2013 | Dimpflmaier et al. |

(Continued)

FOREIGN PATENT DOCUMENTS

| | | |
|---|---|---|
| JP | 2012-015793 | 1/2012 |
| KR | 10-2009-0063830 | 6/2009 |
| KR | 10-1394084 | 5/2014 |

*Primary Examiner* — Joseph E Avellino
*Assistant Examiner* — The Hy Nguyen
(74) *Attorney, Agent, or Firm* — Harness, Dickey & Pierce, P.L.C.

(57) ABSTRACT

A device for performing wireless communication at least one processor configured to generate a condition signal based on at least one parameter associated with the device or the wireless communication, and select at least one of a plurality of signal processing algorithms for performing at least one of a plurality of signal processing functions based on the condition signal, each of the plurality of signal processing functions being associated with the wireless communication.

16 Claims, 23 Drawing Sheets

(56) References Cited

U.S. PATENT DOCUMENTS

| | | | |
|---|---|---|---|
| 8,620,235 B2 | 12/2013 | Riddle et al. | |
| 8,665,779 B2 | 3/2014 | Burgan et al. | |
| 9,268,386 B2 | 2/2016 | Cheng et al. | |
| 9,385,775 B2 | 7/2016 | Ponukumati et al. | |
| 9,578,601 B2 | 2/2017 | Ramkumar et al. | |
| 2005/0048960 A1* | 3/2005 | Yamauchi | H04W 52/0267 455/418 |
| 2012/0220286 A1* | 8/2012 | Chen | H04W 24/10 455/422.1 |
| 2014/0010282 A1* | 1/2014 | He | H04N 19/44 375/240.02 |
| 2014/0098761 A1* | 4/2014 | Lee | H04W 4/70 370/329 |
| 2014/0106827 A1* | 4/2014 | Lim | G06F 9/00 455/574 |
| 2014/0304542 A1* | 10/2014 | Rogers | G01R 31/382 713/340 |
| 2015/0077126 A1* | 3/2015 | Wang | H01M 10/48 324/428 |
| 2017/0324462 A1* | 11/2017 | Chen | H04B 7/0868 |
| 2017/0331670 A1* | 11/2017 | Parkvall | H04B 7/0695 |
| 2018/0007633 A1* | 1/2018 | Mori | H04M 1/00 |
| 2019/0074996 A1* | 3/2019 | Li | H04L 25/0222 |
| 2019/0179549 A1* | 6/2019 | de la Serna | G06F 15/7867 |
| 2019/0215773 A1* | 7/2019 | Ljung | H04W 52/0277 |
| 2020/0028654 A1* | 1/2020 | Chen | H04B 17/345 |
| 2020/0186312 A1* | 6/2020 | Mochizuki | H04W 72/0413 |

* cited by examiner

| Channel Condition | SP level |
|---|---|
| A | 1 |
| B | 2 |
| C | 3 |
| D | 4 |
| E | 5 |

| CQI Index | Transmission scheme at BS | Required signal processing level |
|---|---|---|
| 1 | Scheme a | 1 |
| 2 | Scheme b | 1 |
| 3 | Scheme c | 2 |
| 4 | Scheme d | 3 |
| 5 | Scheme e | 5 |

| RI Index | Transmission scheme at BS | Required signal processing level |
|---|---|---|
| 1 | Scheme a | 1 |
| 2 | Scheme b | 1 |
| 3 | Scheme c | 2 |
| 4 | Scheme d | 3 |
| 5 | Scheme e | 5 |

DEVICES AND METHODS OF SELECTING SIGNAL PROCESSING ALGORITHM BASED ON PARAMETERS

CROSS-REFERENCE TO RELATED APPLICATIONS

This application claims the benefit under 35 U.S.C. § 119 of Korean Patent Application Nos. 10-2018-0010848 and 10-2018-0100570 filed on Jan. 29, 2018 and Aug. 27, 2018, respectively, in the Korean Intellectual Property Office, the disclosures of which are incorporated herein in their entirety by reference.

BACKGROUND

The inventive concepts relate to devices and methods, and more particularly, to devices and methods of selecting a signal processing algorithm based on parameters.

Wireless communication networks may be widely provided to supply various types of communication content such as audio data, video data, packet data, message data, and the like. Recently, a sharp increase in the amount of data processed for transmission over wireless communication networks has occurred with the development of mobile services via wireless communication networks. Accordingly, demand for modems supporting high-speed signal processing has also increased.

SUMMARY

The inventive concepts relate to wireless communication devices and methods of operating the wireless communication devices, and the inventive concepts provide devices including an algorithm select module that selects a signal processing algorithm based on parameters, and also provides methods of operating the devices including the algorithm select module.

According to some example embodiments, there is provided a device for performing wireless communication, the device including a memory storing computer-readable instructions and at least one processor configured to execute the computer-readable instructions to generate a condition signal based on at least one parameter associated with the device or the wireless communication, and select at least one of a plurality of signal processing algorithms for performing at least one of a plurality of signal processing functions based on the condition signal, each of the plurality of signal processing functions being associated with the wireless communication.

According to some example embodiments, there is provided a device for performing wireless communication with a base station via a plurality of channels, the device including a memory storing computer-readable instructions and at least one processor configured to execute the computer-readable instructions to, generate a condition signal based on at least one parameter associated with the plurality of channels or the device, select a first signal processing level for a first signal processing function among a plurality of signal processing functions in response to the condition signal, each of the plurality of signal processing functions being associated with the wireless communication, and select a first signal processing algorithm among a plurality of signal processing algorithms for performing the first signal processing function based on the first signal processing level.

According to some example embodiments, there is provided a method performed by a device for wireless communication with a base station via a plurality of channels. The method includes selecting at least one signal processing level for at least one of a plurality of signal processing functions based on at least one parameter, each of the plurality of signal processing functions being associated with the wireless communication, and selecting at least one signal processing algorithm for the at least one of the plurality of signal processing functions based on the at least one signal processing level.

BRIEF DESCRIPTION OF THE DRAWINGS

Some example embodiments will be more clearly understood from the following detailed description taken in conjunction with the accompanying drawings in which.

DETAILED DESCRIPTION

Hereinafter, some example embodiments will be described in detail with reference to the accompanying drawings.

Figure 1:
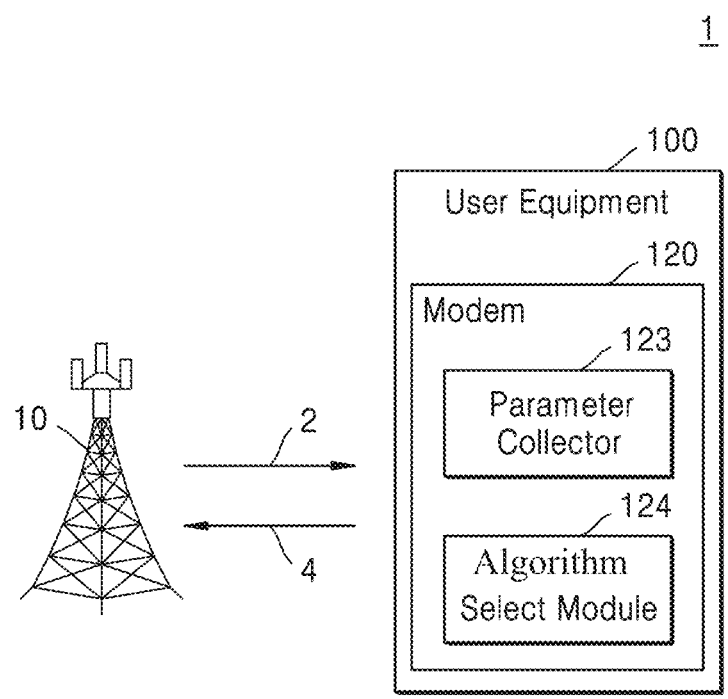
FIG. 1 is a block diagram of a wireless communication system, according to some example embodiments.

FIG. 1 is a block diagram of a wireless communication system, according to some example embodiments. Referring to FIG. 1, a wireless communication system 1 may include a base station (or cell) 10 and a user equipment (UE) 100.

The base station 10 may wirelessly communicate with the user equipment 100 via one or more base station antennae. For example, the base station 10 may communicate with the user equipment 100 via a downlink (DL) channel 2 and an uplink (UL) channel 4. A wireless communication network between the base station 10 and the user equipment 100 may support communication between a large number of users by sharing available network resources. For example, in the wireless communication network, information may be transferred in various manners such as code division multiple access (CDMA), frequency division multiple access (FDMA), time division multiple access (TDMA), orthogonal frequency division multiple access (OFDMA), single carrier frequency division multiple access (SC-FDMA), and/or the like.

Although one base station 10 is shown in FIG. 1, this is merely for convenience in explanation, and the wireless communication system 1 may include various numbers of base stations 10. In addition, the wireless communication system 1 may include different types of base stations (for example, macro, micro, and/or pico base stations).

The base station 10 may provide communication coverage for a determined geographical region. In some examples, the base station 10 may be referred to as a base transceiver station (BTS), a radio base station, an access point (AP), a radio transceiver, a NodeB, an eNodeB (eNB), a Home NodeB, and/or another appropriate term.

The user equipment 100 is wireless communication equipment, and may refer to various equipment which may be fixed and/or mobile and may transmit and/or receive data and/or control information by communicating with the base station 10. For example, the user equipment 100 may be referred to as terminal equipment, a mobile station (MS), a mobile terminal (MT), a user terminal (UT), a subscriber station (SS), a wireless device, a handheld device, a mobile device, a smart phone, a tablet computer, a personal digital assistant (PDA), and/or the like.

The user equipment 100 may include a modem 120. The modem 120 may be configured to perform various functions related to a wireless interface between the base station 10 and the user equipment 100. For example, the modem 120 may be configured to perform communication functions such as modulation of signals transmitted to the base station 10 and/or demodulation of signals received from the base station 10, various encoding and/or decoding used for communication with the base station 10, and/or the like.

In some example embodiments, the modem 120 may include a parameter collector 123 and an algorithm select module 124. The parameter collector 123 may collect, as a reference parameter, at least one of parameters associated with the user equipment 100, parameters associated with the modem 120, and/or parameters associated with wireless communication between the base station 10 and the user equipment 100. The parameter collector 123 may output a condition signal based on the collected reference parameter.

In some example embodiments, the modem 120 may transmit parameter information collected by the parameter collector 123 to the base station 10. As an example, the modem 120 may transmit channel state information to the base station 10, the channel state information may include the parameter information along with a signal processing level and a signal processing algorithm that are selected based on the parameter information. The base station 10 may determine a signal processing level for the user equipment 100, and a transmission scheme, based on the received channel state information.

According to some example embodiments, operations described herein as being performed by any or all of the user equipment 100, the modem 120, the parameter collector 123 and/or the algorithm select module 124 may be performed by at least one processor (e.g., at least one processor included in the user equipment 100 and/or the modem 120) executing program code that includes instructions corresponding to the operations. The instructions may be stored in a memory of the user equipment 100. The term 'processor,' as used in the present disclosure, may refer to, for example, a hardware-implemented data processing device having circuitry that is physically structured to execute desired operations including, for example, operations represented as code and/or instructions included in a program. In at least some example embodiments, the above-referenced hardware-implemented data processing device may include, but is not limited to, a microprocessor, a central processing unit (CPU), a processor core, a multi-core processor; a multiprocessor, an application-specific integrated circuit (ASIC), and a field programmable gate array (FPGA). According to some example embodiments, operations described as being performed by any or all of the user equipment 100, the modem 120, the parameter collector 123 and/or the algorithm select module 124 may be performed by circuitry. For example, the circuitry may include an ASIC or a FPGA. The algorithm select module 124 may select an algorithm for signal processing of each of a plurality of functional blocks included in the modem 120 in response to the condition signal output from the parameter collector 123. In some example embodiments, the algorithm select module 124 may select a signal processing level for each of the functional blocks in response to the condition signal and may select a signal processing algorithm for each of the functional blocks based on the selected signal processing level.

In some example embodiments, the modem 120 may support a high-speed signal processing mode for wireless communication signals. For example, when the number of wireless resources for wireless communication between the base station 10 and the user equipment 100 is equal to or greater than a determined threshold value, the modem 120 may support the high-speed signal processing mode. In another example, when an amount of data transmitted and/or received between the base station 10 and the user equipment 100 is equal to or greater than a determined threshold value, the modem 120 may support the high-speed signal processing mode. In the high-speed signal processing mode, the modem 120 may perform more signal processing, by a certain rate or more, than in the case of normal signal processing (e.g., a higher signal processing throughput) for a certain period of time.

In some example embodiments, the parameter collector 123 and the algorithm select module 124 may perform a parameter collect operation and an algorithm select operation, respectively, when the modem 120 supports the high-speed signal processing mode. However, the inventive concepts are not limited thereto, and the parameter collector 123 and the algorithm select module 124 may perform the parameter collect operation and the algorithm select operation, respectively, even in the case of normal signal processing.

Figure 2:
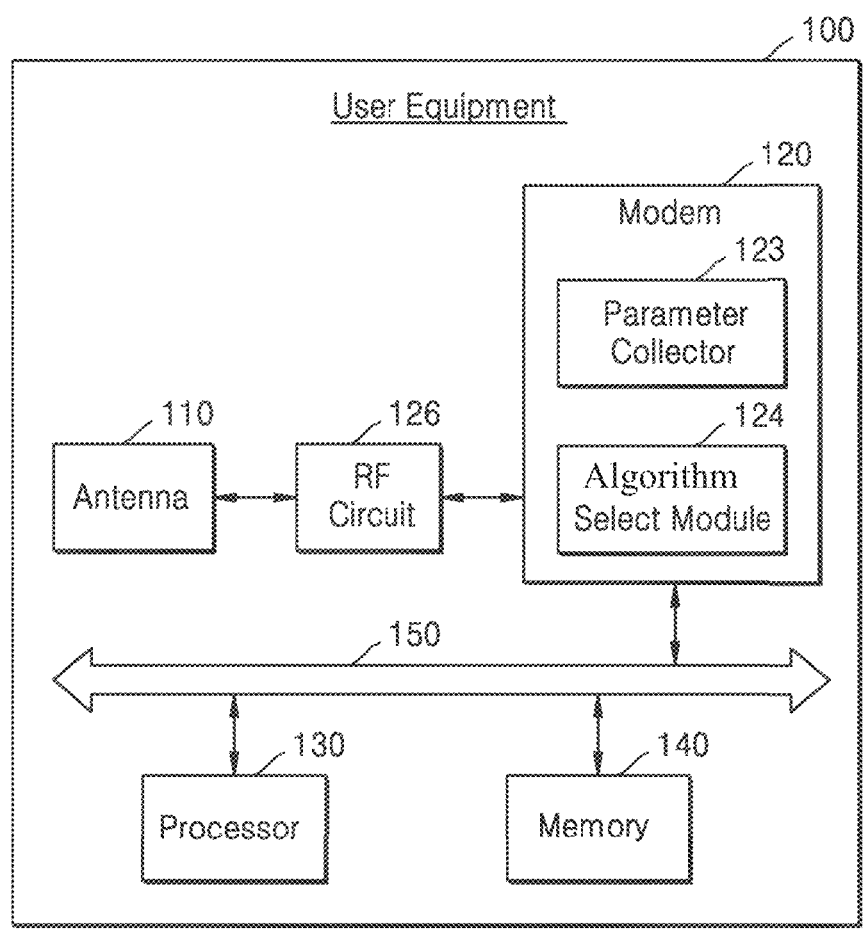
FIG. 2 is a block diagram illustrating a configuration of a user equipment, according to some example embodiments.

FIG. 2 is a block diagram illustrating a configuration of a user equipment, according to some example embodiments. FIG. 2 may be, for example, a block diagram of the user equipment 100 of FIG. 1.

Referring to FIG. 2, the user equipment 100 may include an antenna 110, the modem 120, a radio frequency (RF) circuit 126, at least one processor 130, memory 140, and a system interconnect 150. Each of the components included in the user equipment 100 (e.g., the RF circuit 126, the modem 120, the parameter collector 123 and/or the algorithm select module) may be a hardware block including an analog circuit and/or a digital circuit (e.g., an ASIC, a FPGA, etc.), and/or a software block including a plurality of instructions executed by at least one processor (e.g., the at least one processor 130), and/or the like. The software block may be stored in a memory of the user equipment 100 (e.g., the memory 140).

The RF circuit 126 may receive a wireless signal transmitted by the base station 10. For example, the RF circuit 126 may convert a wireless signal in a frequency band having a high center frequency to a baseband signal and thus output the wireless signal to the modem 120. In other words, the RF circuit 126 may demodulate the received wireless signal such that the modem 120, the processor 130, and/or the memory 140 may perform signal processing thereof. In addition, the RF circuit 126 may receive data or the like from the modem 120, perform modulation thereof, and transmit the data or the like to the base station 10 via the antenna 110.

The processor 130 may include an intelligent hardware device such as a central processing unit (CPU), a microcontroller, an application processor, a graphics processing unit (GPU), and/or the like. In some example embodiments, the processor 130 may output a determined performance index for the user equipment 100 to the parameter collector 123. For example, the processor 130 may output, as a performance index, the quality of programs used in the user equipment 100, performance levels specifications of programs, a determined wireless-communication-related performance level specification of the modem 120, and/or the like to the parameter collector 123.

The memory 140 may include, for example, a volatile memory device such as dynamic random access memory (DRAM), synchronous dynamic random access memory (SDRAM), and/or the like. In addition, the memory 140 may include, for example, a nonvolatile memory device such as electrically erasable programmable read-only memory (EEPROM), flash memory, phase change random access memory (PRAM), resistance random access memory (RRAM), nano floating gate memory (NFGM), polymer random access memory (PoRAM), magnetic random access memory (MRAM), ferroelectric random access memory (FRAM), and/or the like.

The memory 140 may store software code that is computer-readable and/or computer-executable and includes a plurality of instructions. In some example embodiments, the memory 140 may store a plurality of signal processing algorithms for performing signal processing in relation to wireless communication. The plurality of signal processing algorithms stored in the memory 140 may be executed by various functional blocks included in the modem 120. For example, at least two of the signal processing algorithms stored in the memory 140 may have a different level of complexity from each other.

Herein, the complexity of an algorithm may vary based on an amount of computations, the frequency of clock signals, the number of logic blocks, the number of adders, the number of processing repetitions within the algorithm, the number of samples of a result, a degree of prior information utilized, and/or the like. For example, the complexity of an algorithm may increase with the increasing amount of computations of the algorithm, and may decrease with the decreasing numbers of logic blocks for performing the algorithm. In some example embodiments, a signal processing algorithm may have increasing complexity with an increasing level of signal processing (e.g., the number of processing repetitions, etc.).

The system interconnect 150 may be implemented as a bus to which a protocol having a determined standard bus specification is applied. For example, an advanced microcontroller bus architecture (AMBA) protocol of Advanced Reduced Instruction Set Computing (RISC) Machine (ARM) Co., Ltd. may be used as the standard bus specification. Bus types of the AMBA protocol may include advanced high-performance bus (AHB), advanced peripheral bus (APB), advanced extensible interface (AXI), AXI4, AXI coherency extensions (ACE), and/or the like.

The parameter collector 123 may collect, as a reference parameter, at least one of parameters associated with the user equipment 100, parameters associated with the modem 120, and/or parameters associated with wireless communication between the base station 10 and the user equipment 100. In some example embodiments, the parameter collector 123 may collect parameters regarding a channel for wireless communication of the user equipment 100. For example, the parameter collector 123 may collect channel parameters from a transceiver included in the RF circuit 126.

In some example embodiments, the parameter collector 123 may collect a performance index of the user equipment 100, and/or a performance index of the modem 120, as a reference parameter. For example, the parameter collector 123 may collect the performance index of the user equipment 100, and/or the modem 120, from the processor 130.

In some example embodiments, the parameter collector 123 may collect temperature information of the user equipment 100, and/or temperature information of the modem 120, as a reference parameter. For example, the user equipment 100 may include a temperature sensor (not shown), and the parameter collector 123 may collect temperature information output from the temperature sensor as a reference parameter.

In some example embodiments, the parameter collector 123 may collect power information of the user equipment 100, and/or power information of the modem 120, as a reference parameter. For example, the user equipment 100 may include a power source (not shown), and the parameter collector 123 may collect power information output from the power source as a reference parameter.

The algorithm select module 124 may select signal processing algorithms of various functional blocks for wireless communication signal processing based on the reference parameter collected by the parameter collector 123. For example, the algorithm select module 124 may select signal processing levels of various functional blocks and select a signal processing algorithm corresponding to each of the signal processing levels, in response to a condition signal output from the parameter collector 123. This will be described below in detail.

High-speed data processing by conventional modems may include signal processing operations of high complexity, such as broadband signal processing and multiple antenna signal processing. Thus, conventional modems performing high-speed data processing consume more power generate more heat, resulting in a higher risk of malfunction. The user equipment according to the inventive concepts may adaptively select a signal processing algorithm for wireless communication based on wireless communication-associated parameters and/or user equipment-associated parameters. Thus, since an optimum and/or more efficient signal processing algorithm for signal processing of wireless communication may be selected, signal processing of wireless communication may be efficiently performed. In addition, power consumption and heat generation of the user equipment caused by signal processing may be reduced and/or minimized.

Figure 3:
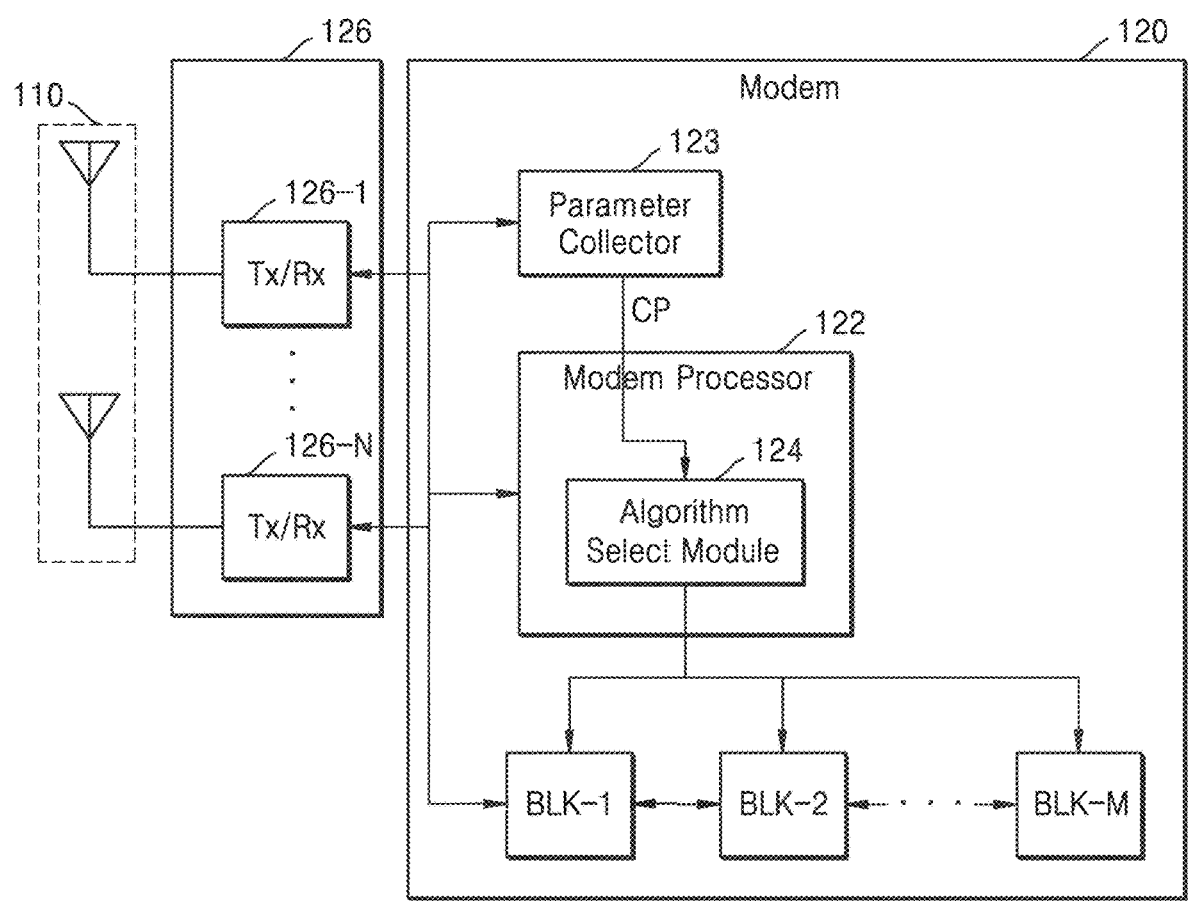
FIG. 3 is a block diagram illustrating a configuration of a modem, according to some example embodiments.

FIG. 3 is a block diagram illustrating a configuration of a modem, according to some example embodiments.

Referring to FIG. 3, the modem 120 may include at least one modem processor 122, the parameter collector 123, the algorithm select module 124, and a plurality of functional blocks BLK-1 to BLK-M (where M is a positive integer equal to or greater than 1). For example, the algorithm select module 124 may be driven by the modem processor 122. In addition, the RF circuit 126 may include a plurality of transceivers 126-1 to 126-N (where N is a positive integer equal to or greater than 1) respectively connected to antennae 110. According to some example embodiments, operations described herein as being performed by any or all of the plurality of transceivers 126-1 to 126-N and/or the functional blocks BLK-1 to BLK-M may be performed by at least one processor (e.g., at least one modem processor 122) executing program code that includes instructions corresponding to the operations. The instructions may be stored in a memory of the user equipment 100 (e.g., the memory 140). According to some example embodiments, operations described as being performed by any or all of the plurality of transceivers 126-1 to 126-N and/or the functional blocks BLK-1 to BLK-M may be performed by circuitry. For example, the circuitry may include an ASIC or a FPGA.

Each of the functional blocks BLK-1 to BLK-M (also referred to herein as "functional groups") may perform signal processing associated with wireless communication. For example, the functional blocks BLK-1 to BLK-M may include a functional block configured to perform channel estimation, a functional block configured to perform beamforming, a functional block configured to process and/or detect via a plurality of antennae 110 (e.g., a multiple input multiple output (MIMO) processing block and/or an MIMO detection block), a functional block configured to remove interference of wireless signals, and/or the like. According to some example embodiments, an output of a functional block may be used for signal processing of another functional block.

In some example embodiments, the parameter collector 123 may be connected to the transceivers 126-1 to 126-N and may collect, as a reference parameter, one or more channel parameters from the transceivers 126-1 to 126-N. The channel parameters may refer to various parameters for a wireless communication channel. For example, the channel parameters may be divided into a plurality of groups (e.g., groups A-E, also referred to herein as "channel conditions"), and each group may include channel parameters as follows.

A. Frequency/Time/Spatial correlations between base station 10 and antenna 110
 B. Signal-to-noise ratio (SNR), and/or Signal-to-interference-plus-noise ratio (SINR)
 C. Doppler characteristics such as Doppler spread, Doppler shift, and/or the like
 D. Delay characteristics such as maximum and/or minimum delay paths, delay spread, and/or the like, and/or Time dominant path
 E. Spatially dominant path, and/or Angular characteristics such as angular spread and/or the like The parameter collector 123 may output a condition signal CP based on one or more collected channel parameters. For example, the condition signal CP may include an indication of the channel parameters. In some example embodiments, the algorithm select module 124 may determine one or more channel conditions for each of the functional groups BLK-1 to BLK-M in response to the condition signal CP. For example, the algorithm select module 124 may determine channel conditions for use by different functional blocks based on the collected channel parameters. In addition, in some example embodiments, the algorithm select module 124 may select a signal processing algorithm of each of the functional groups BLK-1 to BLK-M, based on the determined channel conditions of each of the functional groups BLK-1 to BLK-M.

In some example embodiments, the algorithm select module 124 may select a signal processing algorithm for the functional group performing channel estimation, based on at least one of the channel parameters (e.g., channel conditions) included in the groups A, C, and D. As an example, when the frequency and/or time correlation between the base station 10 and the antenna 110 is high (e.g., based on comparison to one or more correlation thresholds), the algorithm select module 124 may select a low-complexity algorithm as the signal processing algorithm for the functional group performing channel estimation.

In some example embodiments, the algorithm select module 124 may select a signal processing algorithm for the functional group associated with beamforming, based on at least one of the channel parameters included in the group E. In addition, in some example embodiments, the algorithm select module 124 may select a signal processing algorithm for the functional block associated with processing and/or detection of signals via the plurality of antennae 110 based on at least one of the channel parameters included in the groups A and B. As an example, when the spatial correlation between the base station 10 and the antennae 110 is low, the algorithm select module 124 may select a low-complexity algorithm as the signal processing algorithm for the functional block associated with processing and/or detection of signals via the plurality of antennae 110.

In some example embodiments, the algorithm select module 124 may select a signal processing algorithm for the functional block associated with removing interference of wireless signals based on at least one of the channel parameters included in the group B. As an example, when the signal-to-interference-plus-noise ratio of the user equipment 100 is high (e.g., based on comparison to one or more signal-to-interference-plus-noise ratio thresholds), the algorithm select module 124 may select a low-complexity algorithm as the signal processing algorithm for the functional block associated with removing interference of wireless signals.

Figure 4A:
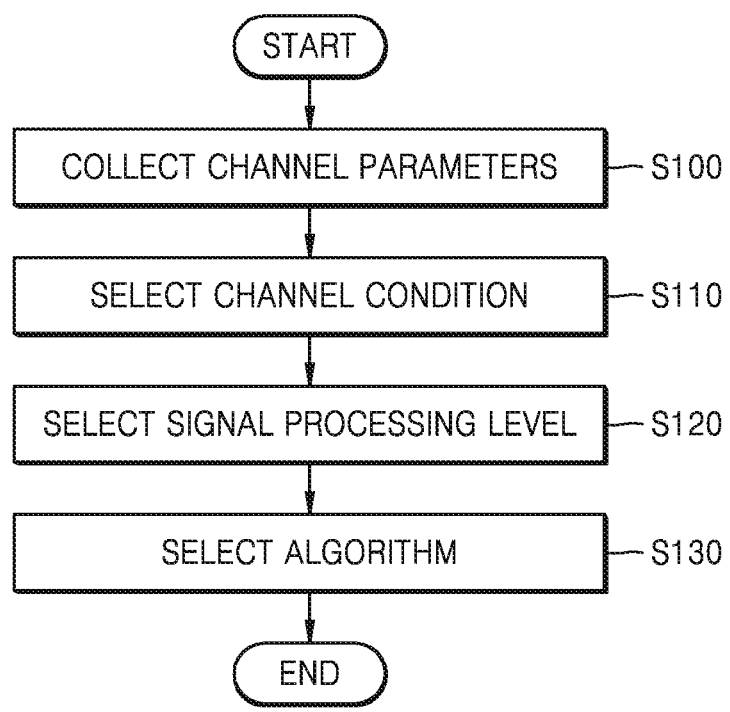
FIGS. 4A to 4D are diagrams illustrating an operation of a modem, according to some example embodiments.
Figure 4B:
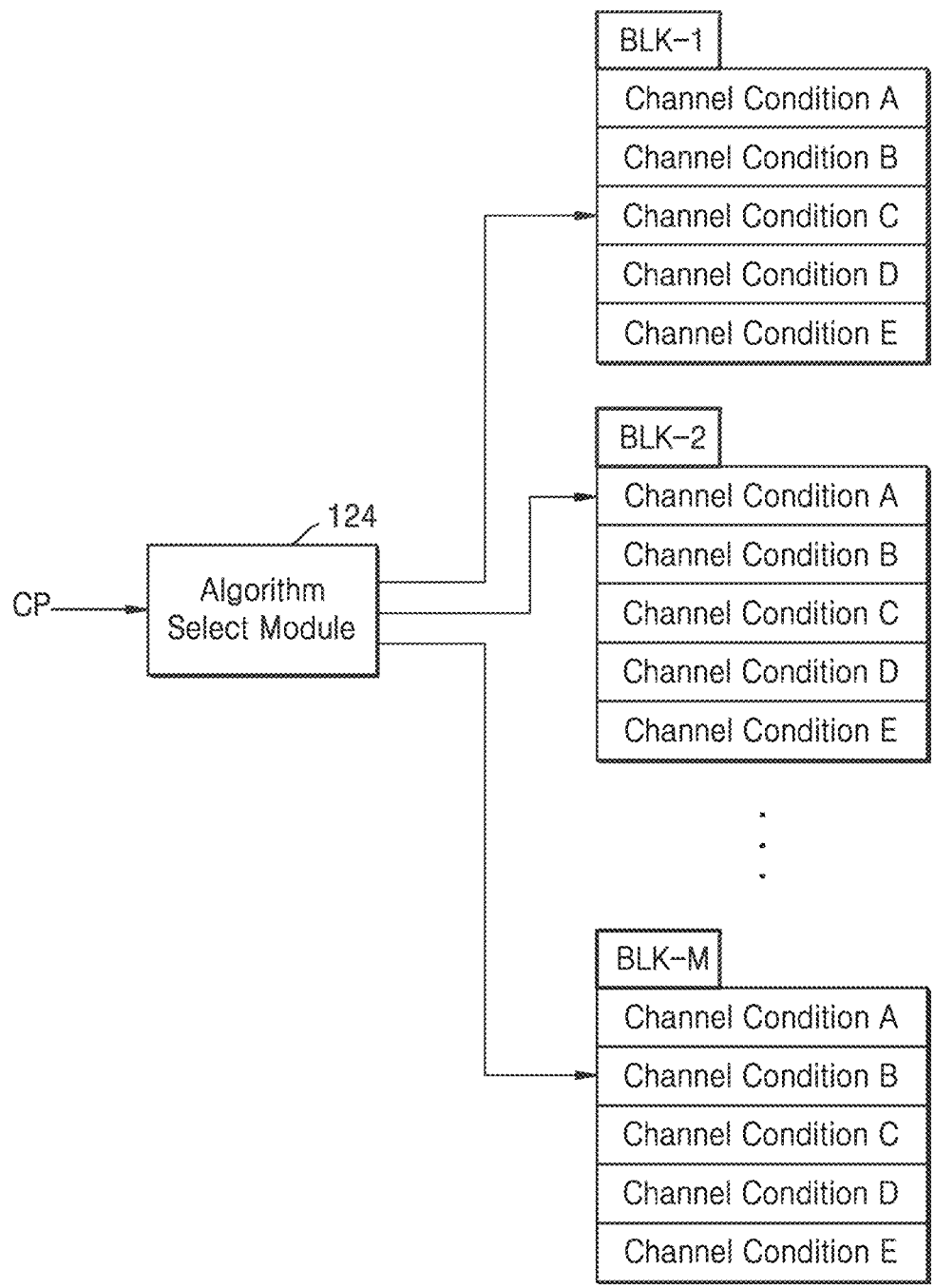
Figure 4C:
Figure 4D:
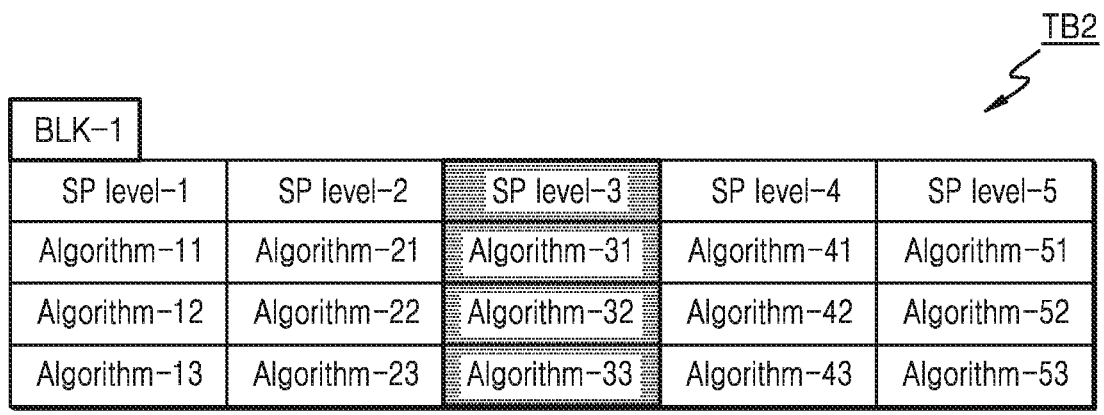

FIGS. 4A to 4D are diagrams illustrating an operation of a modem, according to some example embodiments. FIG. 4A is a flowchart illustrating an operation of the modem, FIG. 4B is a schematic diagram illustrating channel condition selection of each functional block, FIG. 4C is a table illustrating a signal processing level corresponding to each channel condition, and FIG. 4D is a table illustrating signal processing algorithms corresponding to each signal processing level. Hereinafter, descriptions of FIGS. 4A to 4D will be made with reference to FIG. 3.

Referring to FIG. 4A, the parameter collector 123 may collect channel parameters from the transceivers 126-1 to 126-N (S100). The parameter collector 123 may output the condition signal CP including information on the collected channel parameters to the algorithm select module 124.

Next, the algorithm select module 124 may select a channel condition for each of the functional blocks BLK-1 to BLK-M in response to the condition signal CP (S110). Referring further to FIG. 4B, channel conditions selectable for each of the functional blocks BLK-1 to BLK-M may be provided. The algorithm select module 124 may separately select a channel condition for each functional block in response to the condition signal CP. For example, the algorithm select module 124 may select a channel condition C for a first functional block BLK-1, a channel condition A for a second functional block BLK-2, and a channel condition B for an M-th functional block BLK-M.

Next, the algorithm select module 124 may select a signal processing level for each functional block based on the selected channel condition (S120). The signal processing level may refer to a level of a signal during signal processing of each functional block.

Referring further to FIG. 4C, a table TB1 including channel conditions and signal processing levels SP level corresponding to the respective channel conditions may be provided. In some example embodiments, the table TB1 may be stored in separate memory within the modem processor 122 and/or the memory 140. According to the table TB1, the algorithm select module 124 may select, for example, a level 1 under a channel condition A, a level 2 under a channel condition B, a level 3 under a channel condition C, a level 4 under a channel condition D, and a level 5 under a channel condition E, as a signal processing level.

Next, the algorithm select module 124 may select a signal processing algorithm for each functional block based on the selected signal processing level (S130). In some example embodiments, the complexity of the selected signal processing algorithm may increase with a higher signal processing level. For example, one or more signal processing algorithms may correspond to each signal processing level.

Referring further to FIG. 4D, for example, for the first functional block BLK-1, a table TB2, which includes signal processing levels SP level-1 to SP level-5 and signal processing algorithms corresponding thereto, may be provided. In some example embodiments, the table TB2 may be stored in separate memory within the modem processor 122 and/or the memory 140. For example, when the algorithm select module 124 selects a third signal processing level SP level-3 as a signal processing level of the first functional block BLK-1, the algorithm select module 124 may select one of three algorithms Algorithm-31 to Algorithm-33 as a signal processing algorithm of the first functional block BLK-1. Although three algorithms are shown as being selectable for each signal processing level, this is merely an example, and the number of selectable algorithms for each signal processing level may be less or greater than three. According to some example embodiments, a different table, a similar table or the same table as table TB2 may be used to select a signal processing algorithm for second functional block BLK-2 through M-th functional block BLK-M.

Figure 5A:
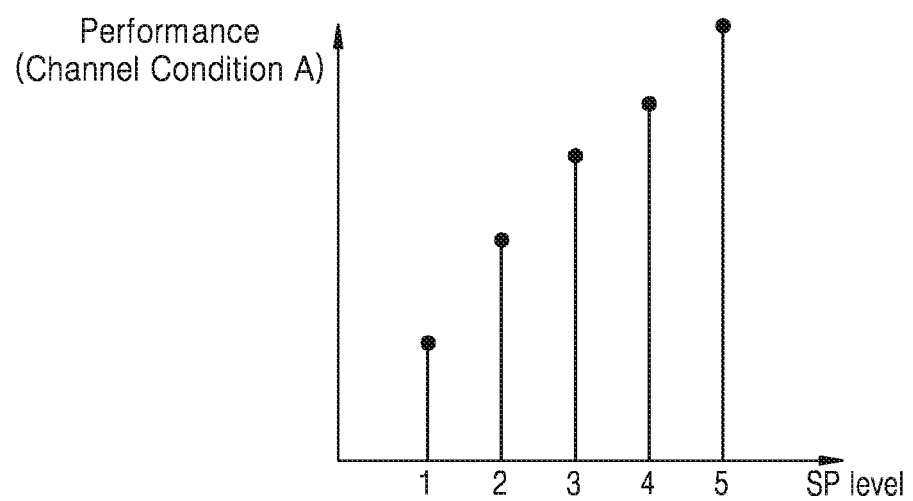
FIGS. 5A and 5B illustrate graphs each depicting signal processing performance in association with corresponding signal processing levels for different channel conditions.
Figure 5B:
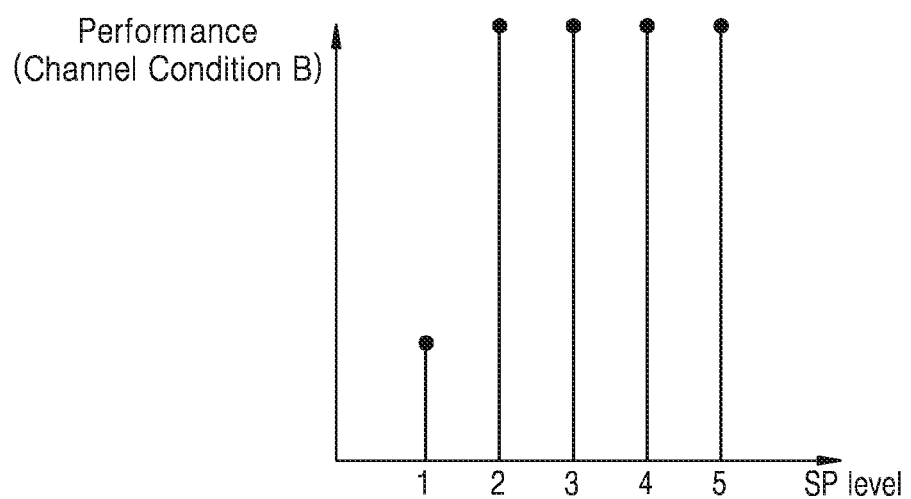

FIGS. 5A and 5B illustrate graphs each depicting signal processing performance, in association with corresponding signal processing levels, for each channel condition. FIGS. 5A and 5B may illustrate, for example, graphs of the first functional block BLK-1 according to different channel conditions.

Referring to FIGS. 5A and 5B, when the channel condition A is selected for the first functional block BLK-1, the signal processing performance of the first functional block BLK-1 may gradually increase with an increasing signal processing level. On the other hand, when the channel condition B is selected for the first functional block BLK-1, the signal processing performance of the first functional block BLK-1 may be closer to saturation as the signal processing level becomes higher than one or more determined threshold levels. For example, when the channel condition B is selected for the first functional block BLK-1, the signal processing performance of the first functional block BLK-1 may sharply increase as the signal processing level changes from the level 1 to the level 2. However, even though the signal processing level changes from the level 2 to a higher level than the level 2, the signal processing performance of the first functional block BLK-1 may be maintained at an equal (or similar) level.

According to the inventive concepts, the algorithm select module 124 may select a channel condition for each functional block based on channel parameters and may select a signal processing level, and a signal processing algorithm corresponding to the signal processing level, based on the selected channel condition. Thus, since an optimum and/or more efficient signal processing algorithm may be selected to perform signal processing in each functional block, the signal processing of wireless communications may be more efficiently performed. In addition, power consumption and heat generation caused by signal processing may be reduced and/or minimized.

Figure 6:
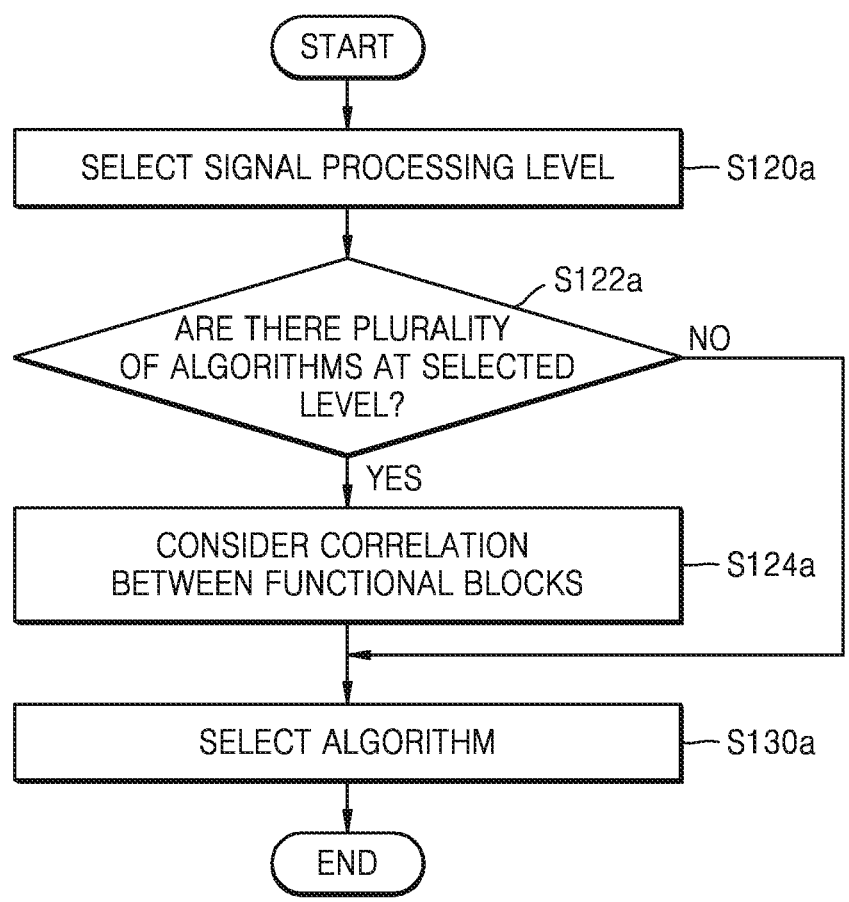
FIG. 6 is a flowchart illustrating an operation of a modem for selecting functional block algorithms based on correlation between functional blocks, according to some example embodiments.

FIG. 6 is a flowchart illustrating an operation of a modem for selecting functional block algorithms based on correlation between functional blocks, according to some example embodiments. Hereinafter, a description of FIG. 6 may be made with reference to FIG. 3.

Referring to FIG. 6, the algorithm select module 124 may select a signal processing level for each of the functional blocks BLK-1 to BLK-M (S120a). Next, the algorithm select module 124 may determine, for each functional block, whether there are a plurality of signal processing algorithms corresponding to the selected signal processing level (S122a). For example, when the signal processing level selected for the first functional block BLK-1 is a level 3, the algorithm select module 124 may determine whether the number of signal processing algorithms corresponding to the level 3 is one or greater. When the number of signal processing algorithms corresponding to the selected signal processing level is one, the algorithm select module 124 may select the corresponding algorithm as a signal processing algorithm (S130a).

When the number of signal processing algorithms corresponding to the selected signal processing level is two or more, the algorithm select module 124 may consider a correlation between the functional blocks (S124a). For example, when the signal processing algorithm of the first functional block BLK-1 is selected, the algorithm select module 124 may consider a correlation between the first functional block BLK-1 and the other functional blocks (e.g., functional blocks BLK-2 through BLK-M).

As an example, the algorithm select module 124 may consider the correlation set forth above, based on whether an output of another functional block is used for signal processing of the first functional block BLK-1, similarity in signal processing between the first functional block BLK-1 and another functional block, and/or the like. As such, after considering a correlation of each of the functional blocks BLK-1 to BLK-M, the algorithm select module 124 may select the signal processing algorithm of each functional block based thereon (S130a).

Figure 7:
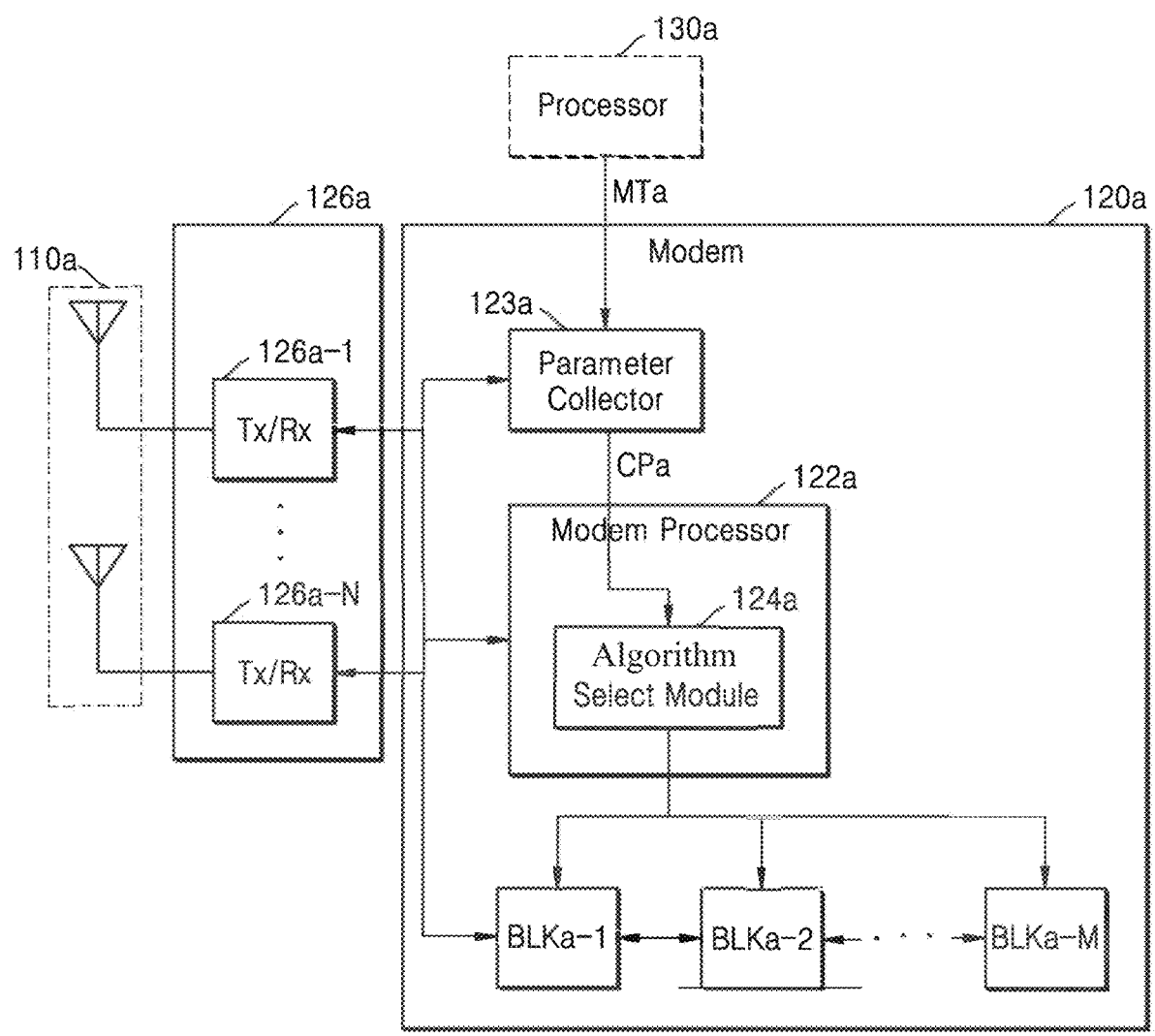
FIG. 7 is a block diagram illustrating a configuration of a modem that generates a condition signal based on a performance index, according to some example embodiments.

FIG. 7 is a block diagram illustrating a configuration of a modem that generates a condition signal based on a performance index, according to some example embodiments. In a description regarding FIG. 7, repeated descriptions between FIG. 7 and FIG. 3 will be omitted.

Referring to FIG. 7, a parameter collector 123a may collect, as a reference parameter, a performance index MTa from a source external to a modem 120a. In some example embodiments, the parameter collector 123a may receive the performance index MTa from at least one processor 130a. The performance index MTa may be an index relating to the performance of the modem 120a, and/or an index relating to the performance of the user equipment (for example, 100 of FIG. 1) including the modem 120a. For example, the processor 130a may output, as a performance index, the quality of programs used in the user equipment (for example, 100 of FIG. 1), performance level specifications of programs, a determined wireless-communication-related performance level specification of the modem 120a, and/or the like to the parameter collector 123a. According to some example embodiments, any or all of the antenna 110a, the RF circuit 126a, the plurality of transceivers 126a-1 to 126a-N, the modem 120a, the parameter collector 123a, the modem processor 122a, the algorithm select module 124a and/or functional blocks BLKa-1 to BLKa-m are similar to or the same as the antenna 110, the RF circuit 126, the plurality of transceivers 126-1 to 126-N, the modem 120, the parameter collector 123, the modem processor 122, the algorithm select module 124 and/or functional blocks BLK-1 to BLK-m, respectively. According to some example embodiments, the processor 130a may be included in an external server (e.g., a manufacturer server).

The parameter collector 123a may output a condition signal CPa including performance specification information to an algorithm select module 124a based on the collected performance index MTa. In some example embodiments, the algorithm select module 124a may select a signal processing algorithm for at least one of functional blocks BLKa-1 to BLKa-M based on the condition signal CPa.

As an example, the algorithm select module 124a may select a functional block associated with the performance specification information according to the condition signal CPa. In addition, the algorithm select module 124a may select a signal processing level of the selected functional block according to the condition signal CPa. Further, the algorithm select module 124a may select one of a plurality of signal processing algorithms as a signal processing algorithm for the selected functional block based on the selected signal processing level.

As an example, when the performance specification information included in the condition signal CPa is associated with beamforming, the algorithm select module 124a may select a beamforming-associated functional block. Specifically, when the performance specification is a beamforming gain, the algorithm select module 124a may select a functional block involved in the determination of transmission/reception beams from among beamforming-associated functional blocks. The algorithm select module 124a may select a signal processing level of the selected beamforming-associated functional block and may select a signal processing algorithm based thereon. For example, when the performance specification information is achieved even with only a relatively low beamforming gain, the algorithm select module 124a may select a signal processing level corresponding to a manner of selecting the transmission/reception beams from among designed beams. The algorithm select module 124a may select a signal processing algorithm satisfying the performance specification from among a plurality of signal processing algorithms corresponding to the selected signal processing level. For example, when there are a plurality of signal processing algorithms satisfying the performance specification, the algorithm select module 124a may select a signal processing algorithm having low complexity.

Figure 8:
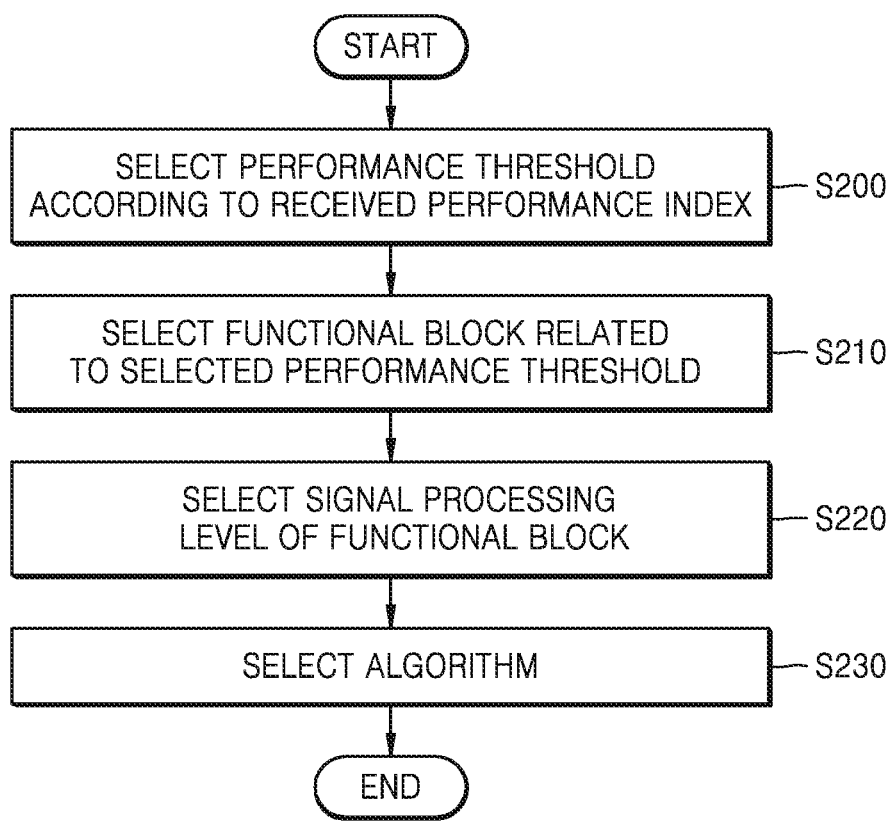
FIG. 8 is a flowchart illustrating an operation of a modem that generates a condition signal based on a performance index, according to some example embodiments.

FIG. 8 is a flowchart illustrating an operation of a modem that generates a condition signal based on a performance index, according to some example embodiments. Hereinafter, a description of FIG. 8 will be made with reference to FIG. 7.

Referring to FIG. 8, the parameter collector 123a may receive the performance index MTa and may select a performance threshold based on the performance index MTa (S200). The parameter collector 123a may output the condition signal CPa indicating the performance threshold to the algorithm select module 124a.

Next, the algorithm select module 124a may select one or more functional blocks associated with the performance threshold from among the functional blocks BLKa-1 to BLKa-M (S210). The algorithm select module 124a may also select a signal processing level of each selected functional block based on the performance threshold (S220). The algorithm select module 124a may select one of the signal processing algorithms corresponding to the selected signal processing level as a signal processing algorithm for each selected functional block (S230). For example, when selecting a signal processing algorithm, the algorithm select module 124a may select an algorithm configured to satisfy the performance threshold from among algorithms corresponding to the signal processing level.

In some example embodiments, when there are two or more signal processing algorithms corresponding to the selected signal processing level, the algorithm select module 124a may select a signal processing algorithm by further considering a correlation between the functional blocks. For example, when there are two or more functional blocks associated with the performance threshold and there are a plurality of signal processing algorithms corresponding to the selected signal processing level for each functional block, the algorithm select module 124a may select a signal processing algorithm of each functional block by further considering a correlation between the functional blocks.

Figure 9:
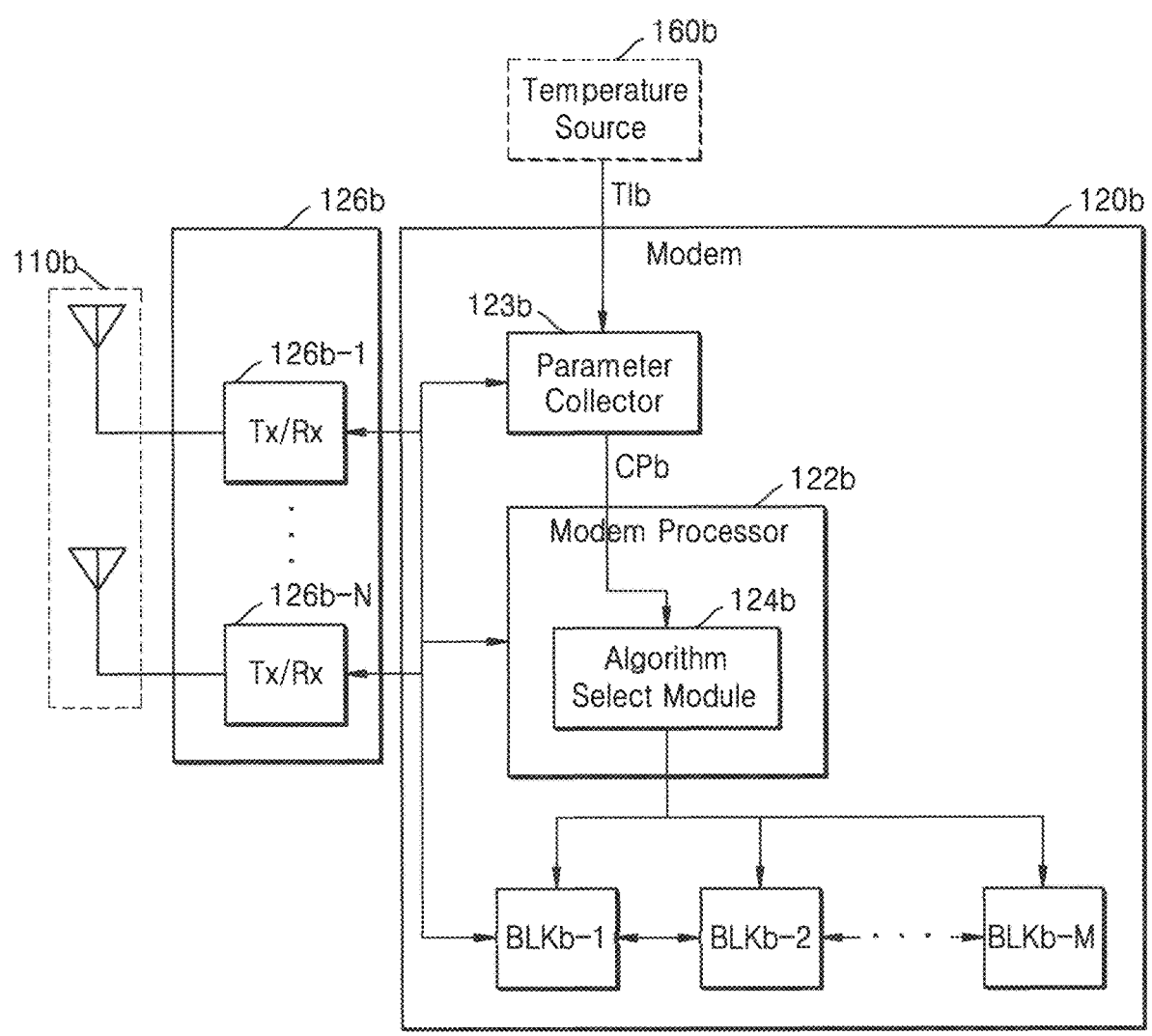
FIG. 9 is a block diagram illustrating a configuration of a modem that generates a condition signal based on temperature information, according to some example embodiments.

FIG. 9 is a block diagram illustrating a configuration of a modem that generates a condition signal based on temperature information, according to some example embodiments. In a description regarding FIG. 9, repeated descriptions between FIG. 9 and FIG. 3 will be omitted.

Referring to FIG. 9, a parameter collector 123b may collect, as a reference parameter, temperature information TIb from a source internal and/or external to a modem 120b. In some example embodiments, the parameter collector 123b may receive the temperature information TIb from a temperature sensor 160b (e.g., the temperature source). The temperature sensor 160b may be provided inside the user equipment (for example, 100 of FIG. 1). Although the temperature sensor 160b is shown as being provided outside the modem 120b, the temperature sensor 160b may be provided inside the modem 120b. The temperature information TIb may include an indication of a temperature of the modem 120b, and/or an indication of a temperature of the user equipment (for example, 100 of FIG. 1). According to some example embodiments, any or all of the antenna 110b, the RF circuit 126b, the plurality of transceivers 126b-1 to 126b-N, the modem 120b, the parameter collector 123b, the modem processor 122b, the algorithm select module 124b and/or functional blocks BLKb-1 to BLKb-m are similar to or the same as the antenna 110, the RF circuit 126, the plurality of transceivers 126-1 to 126-N, the modem 120, the parameter collector 123, the modem processor 122, the algorithm select module 124 and/or functional blocks BLK-1 to BLK-m, respectively. According to some example embodiments, operations described as being performed by any or all of the temperature sensor 160b may be performed by circuitry and/or at least one processor executing program code that includes instructions corresponding to the operations.

The parameter collector 123b may determine whether heat generation should be alleviated (e.g., reduced) based on the collected temperature information TIb. In addition, the parameter collector 123b may output, as a condition signal CPb, the determination of whether heat generation should be alleviated to an algorithm select module 124b.

In some example embodiments, the algorithm select module 124b may select one or more downgrade-target functional blocks from among functional blocks BLKb-1 to BLKb-M based on the condition signal CPb. The downgrade-target functional blocks may refer to functional blocks that are to be reduced in signal processing performance and heat generation. For example, the algorithm select module 124b may select each downgrade-target functional block based on at least one of significance of each functional block, the signal processing performance thereof, and/or contribution thereof to alleviation of heat generation (or complexity thereof).

The algorithm select module 124b may select, for each downgrade-target functional block, a signal processing level corresponding to a degree of alleviation of heat generation based on the condition signal CPb. In addition, the algorithm select module 124b may select one of a plurality of signal processing algorithms as a signal processing algorithm for each downgrade-target functional block based on the selected signal processing level.

Figure 10:
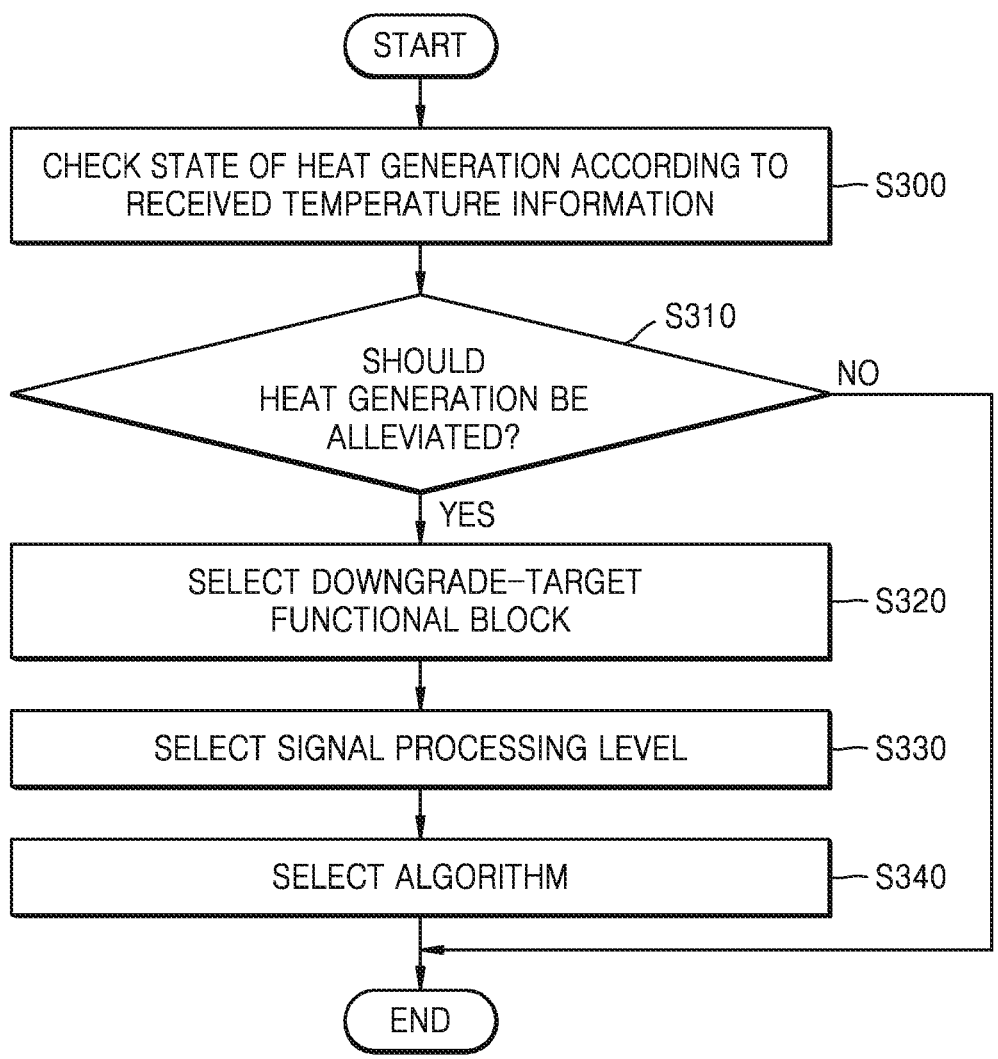
FIG. 10 is a flowchart illustrating an operation of a modem that generates a condition signal based on temperature information, according to some example embodiments.

FIG. 10 is a flowchart illustrating an operation of a modem that generates a condition signal based on temperature information, according to some example embodiments. Hereinafter, a description of FIG. 10 will be made with reference to FIG. 9.

Referring to FIG. 10, the parameter collector 123b may receive the temperature information TIb and may check a state of heat generation of the user equipment (for example, 100 of FIG. 1) and/or the modem 120b based on the temperature information TIb (S300). The parameter collector 123b may determine whether heat generation should be alleviated according to the check of the state of heat generation (S310). For example, the parameter collector 123b may determine whether heat generation should be alleviated based on whether a collected temperature is equal to or greater than one or more determined threshold temperatures. The parameter collector 123b may output, as the condition signal CPb, the determination of whether heat generation should be alleviated to the algorithm select module 124b.

When it is determined that heat generation should not be alleviated, the algorithm select module 124b may not perform a separate algorithm select operation for alleviating heat generation. Instead, the algorithm select module 124b may operate as the algorithm select module 124 as discussed in association with FIG. 4a. On the other hand, when it is determined heat generation should be alleviated, the algorithm select module 124b may select one or more downgrade-target functional blocks based on the condition signal CPb (S320).

Next, the algorithm select module 124b may select a signal processing level of each downgrade-target functional block (S330). The algorithm select module 124b may select one of the signal processing algorithms corresponding to the selected signal processing level as a signal processing algorithm for each downgrade-target functional block (S340).

In some example embodiments, when there are two or more signal processing algorithms corresponding to the selected signal processing level, the algorithm select module 124b may select a signal processing algorithm by further considering a correlation between the functional blocks. For example, when there are two or more downgrade-target functional blocks and there are a plurality of signal processing algorithms corresponding to the selected signal processing level for each functional block, the algorithm select module 124b may select a signal processing algorithm of each functional block by further considering a correlation between the functional blocks.

Figure 11:
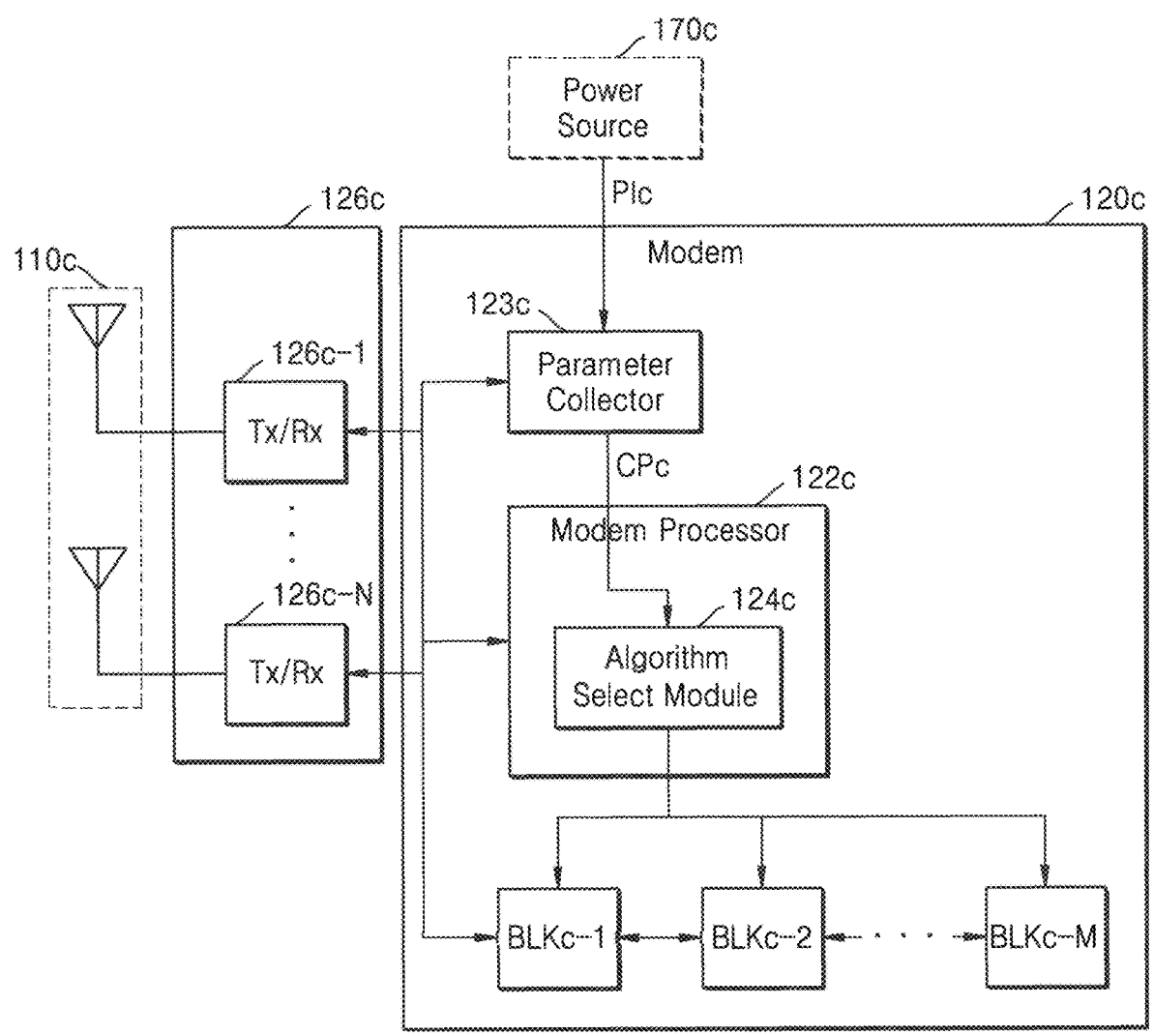
FIG. 11 is a block diagram illustrating a configuration of a modem that generates a condition signal based on power information, according to some example embodiments.

FIG. 11 is a block diagram illustrating a configuration of a modem that generates a condition signal based on power information, according to some example embodiments. In a description regarding FIG. 11, repeated descriptions between FIG. 11 and FIG. 3 will be omitted.

Referring to FIG. 11, a parameter collector 123c may collect, as a reference parameter, power information PIc from a source external to a modem 120c. In some example embodiments, the parameter collector 123c may receive the power information PIc from a power source 170c. The power source 170c may be provided inside the user equipment (for example, 100 of FIG. 1). As an example, the power source 170c may be a chargeable battery without being limited thereto. According to some example embodiments, any or all of the antenna 110c, the RF circuit 126c, the plurality of transceivers 126c-1 to 126c-N, the modem 120c, the parameter collector 123c, the modem processor 122c, the algorithm select module 124c and/or functional blocks BLKc-1 to BLKc-m are similar to or the same as the antenna 110, the RF circuit 126, the plurality of transceivers 126-1 to 126-N, the modem 120, the parameter collector 123, the modem processor 122, the algorithm select module 124 and/or functional blocks BLK-1 to BLK-m, respectively. According to some example embodiments, operations described as being performed by any or all of the power source 170c may be performed by circuitry and/or at least one processor executing program code that includes instructions corresponding to the operations.

The parameter collector 123c may estimate the total amount of available power based on the collected power information PIc. The total amount of available power may be, for example, a value that is based on a charge state of the power source 170c. The parameter collector 123c may output, as a condition signal CPc, the total amount of available power that is estimated to an algorithm select module 124c.

In some example embodiments, the algorithm select module 124c may allocate the total amount of available power to respective functional blocks BLKc-1 to BLKc-M based on the condition signal CPc. For example, the algorithm select module 124c may respectively allocate amounts of power P1 to PM to the functional blocks BLKc-1 to BLKc-M, respectively, and the sum of the amounts of power P1 to PM may be equal to the total amount of available power. According to some example embodiments, the algorithm select module 124c may allocate amounts of power to only a subset of the functional blocks BLKc-1 to BLKc-M, or to a single functional block, based on the condition signal CPc.

In addition, the algorithm select module 124c may select a signal processing level of each functional block based on the allocation of each amount of power to each functional block. The algorithm select module 124c may select one of a plurality of signal processing algorithms as a signal processing algorithm of each functional block based on the selected signal processing level.

Figure 12:
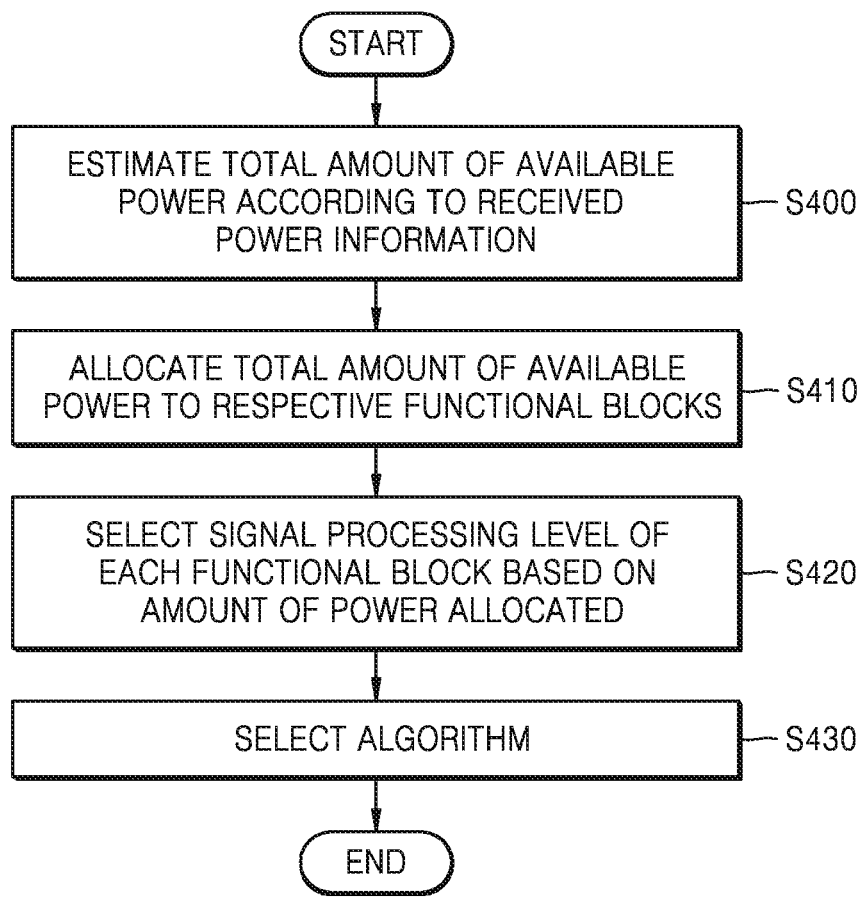
FIG. 12 is a flowchart illustrating an operation of a modem that generates a condition signal based on power information, according to some example embodiments.

FIG. 12 is a flowchart illustrating an operation of a modem that generates a condition signal based on power information, according to some example embodiments. Hereinafter, a description of FIG. 12 will be made with reference to FIG. 11.

Referring to FIG. 12, the parameter collector 123c may receive the power information PIc and may estimate the total amount of available power of the power source 170c based on the power information PIc (S400). The parameter collector 123c may output, to the algorithm select module 124c, the condition signal CPc including information on the total amount of available power.

The algorithm select module 124c may allocate the total amount of available power to the respective functional blocks (S410). The algorithm select module 124c may allocate an amount of power to each functional block based on a function of each of the functional blocks BLKc-1 to BLKc-M.

Next, the algorithm select module 124c may select a signal processing level of each functional block based on the allocated amount of power (S420). The algorithm select module 124c may select a signal processing algorithm for each functional block based on the selected signal processing level of the respective function block (S430).

In some example embodiments, when there are two or more signal processing algorithms corresponding to the selected signal processing level, the algorithm select module 124c may select a signal processing algorithm by further considering a correlation between the functional blocks. For example, when there are a plurality of signal processing algorithms corresponding to the selected signal processing level for each functional block, the algorithm select module 124c may select a signal processing algorithm of each functional block by further considering a correlation between the functional blocks.

Figure 13:
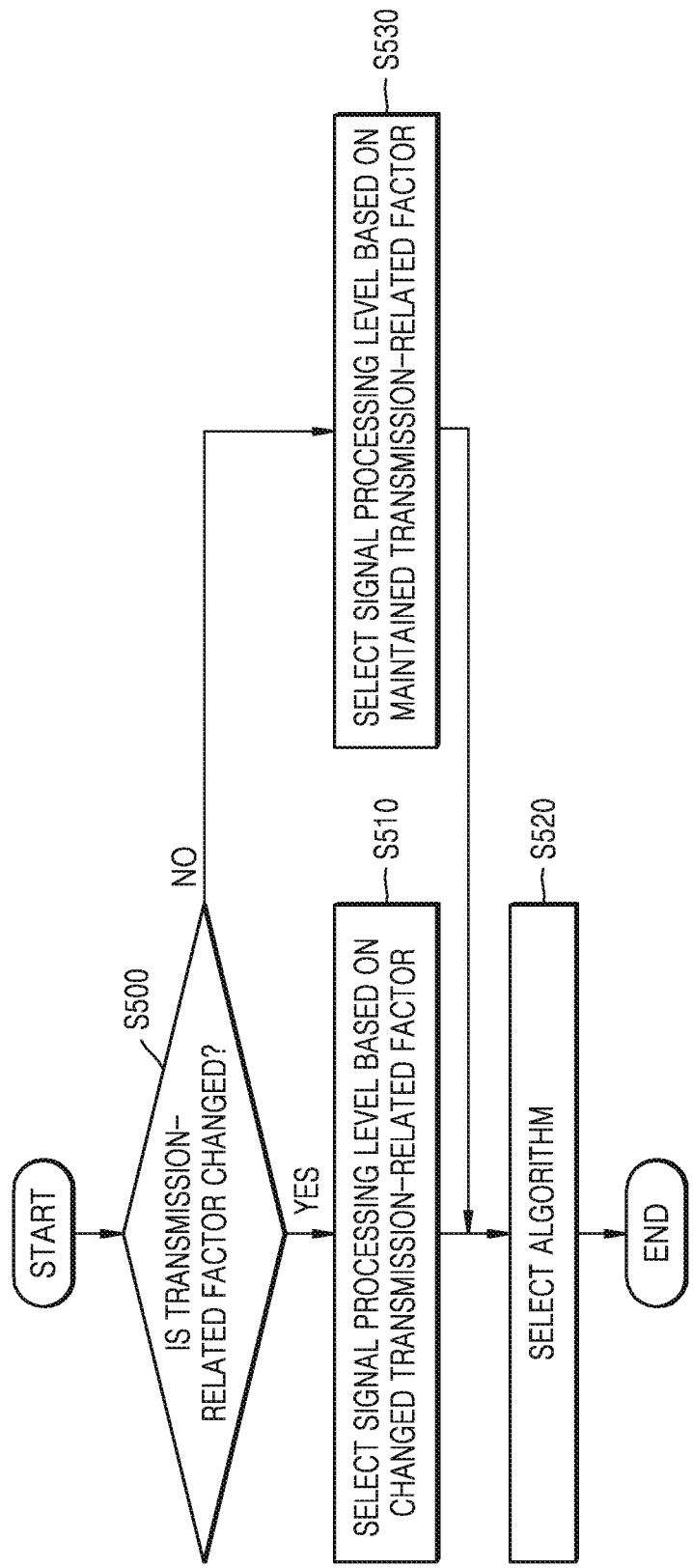
FIG. 13 is a flowchart illustrating an operation of a modem that selects a signal processing level based on a changed or maintained transmission-related factor, according to some example embodiments.

FIG. 13 is a flowchart illustrating an operation of a modem that selects a signal processing level based on a changed or maintained transmission-related factor, according to some example embodiments. FIG. 13 may illustrate, for example, an operation of the modem 120 shown in FIG. 2. Hereinafter, a description of FIG. 13 will be made with reference to FIG. 2.

Referring to FIG. 13, the algorithm select module 124 may determine whether a transmission-related factor of wireless communication has changed (S500). For example, the transmission-related factor of wireless communication may include at least one of a transmission speed, a transmission mode, and/or a transmission scheme.

When the transmission-related factor has not changed, the algorithm select module 124 may select a signal processing level of each functional block (or a subset of the functional blocks) based on the maintained transmission-related factor (S530). On the other hand, when the transmission-related factor has changed, the algorithm select module 124 may select the signal processing level based on the changed transmission-related factor (S510).

Next, the algorithm select module 124 may select a signal processing algorithm for each functional block (or a subset of the functional blocks) based on the selected signal processing level (S520). In some example embodiments, the selection of the signal processing level and/or the signal processing algorithm in operations S510, S520, and S530 may be performed based on the performance index of the user equipment 100 and performance threshold according thereto, the temperature of the user equipment 100 and whether there heat generation should be alleviated according thereto, the total amount of available power of the power source included in the user equipment 100, and/or the like. Descriptions thereof are as given above (e.g., in association with FIGS. 7-12).

Therefore, the algorithm select module 124 may adaptively select the signal processing level and/or the signal processing algorithm of each functional block while maintaining the transmission-related factor, and/or may adaptively select the signal processing level and the signal processing algorithm of each functional block after changing the transmission-related factor first. When the transmission-related factor is changed first, a candidate for the signal processing algorithm to be subsequently selected may be maintained or changed.

As an example, when the signal processing level and the signal processing algorithm of each functional block are selected after the transmission-related factor is changed, the user equipment 100, instead of using all of provided antennae, may adaptively activate some of the antennae according to power consumption and/or a state of heat generation, and then select the signal processing level and the signal processing algorithm of each functional block. As another example, when the signal processing level and the signal processing algorithm of each functional block are selected after the transmission-related factor is changed, the user equipment 100 may reduce a dimension of multiple signal processing by adding up signals input to the provided antennae, and then select the signal processing level and the signal processing algorithm.

Figure 14A:
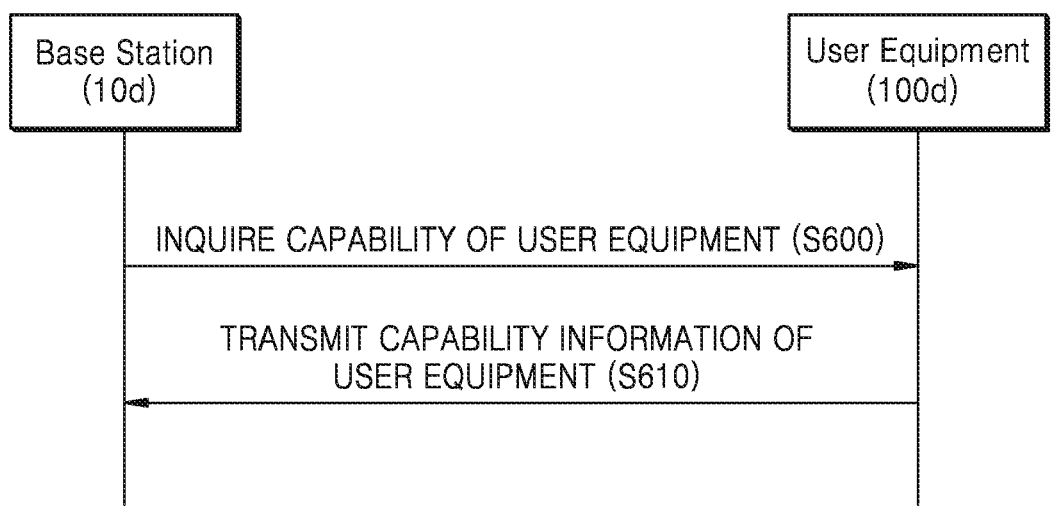
FIGS. 14A and 14B are diagrams illustrating transmission and reception of signals between user equipment and a base station, according to some example embodiments.
Figure 14B:
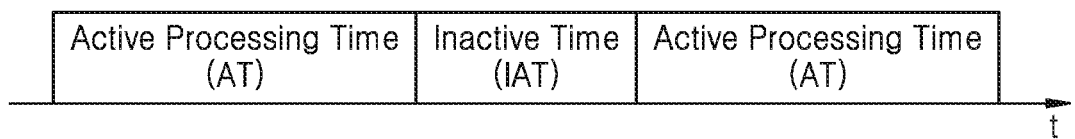

FIGS. 14A and 14B are diagrams illustrating transmission and reception of signals between user equipment and a base station, according to some example embodiments.

Referring to FIGS. 14A and 14B, a base station 10d may inquire regarding a capability of user equipment 100d (S600). For example, the base station 10d may determine a range of signal processing of transmission/reception supportable by the user equipment 100d and may inquire regarding the capability of the user equipment 100d such that wireless communication may be performed within that range. According to some example embodiments, either or both of the base station 10d and/or the user equipment 100d may be similar to or the same as the base station 10 and/or the user equipment 100, respectively.

Next, the user equipment 100d may transmit capability information to the base station 10d in response to the capability inquiry of the base station 10d (S610). In some example embodiments, the user equipment 100d may transmit the capability information, to which information on continuous signal processing time AT (or active processing time) of the modem (for example, 120 of FIG. 1) is added, in response to the capability inquiry of the base station 10d. For example, the user equipment 100d may transmit to the base station 10d, the capability information to which the information on the continuous signal processing time AT is added in order to reduce or eliminate a burden on the base station 10d in requesting continuous signal processing of the user equipment 100d beyond a determined period of time.

In some example embodiments, the user equipment 100d may transmit the capability information to which information on idle time IAT (or inactive time) subsequent to the continuous signal processing time AT (or between continuous signal processing times AT) of the modem (for example, 120 of FIG. 1) is further added, in response to the capability inquiry of the base station 10d. For example, to request to ensure the determined idle (or inactive) time IAT for alleviation of heat generation due to the continuous signal processing time of the modem, the user equipment 100d may transmit, to the base station 10d, the capability information to which the information on the idle time IAT is added.

Figure 15:
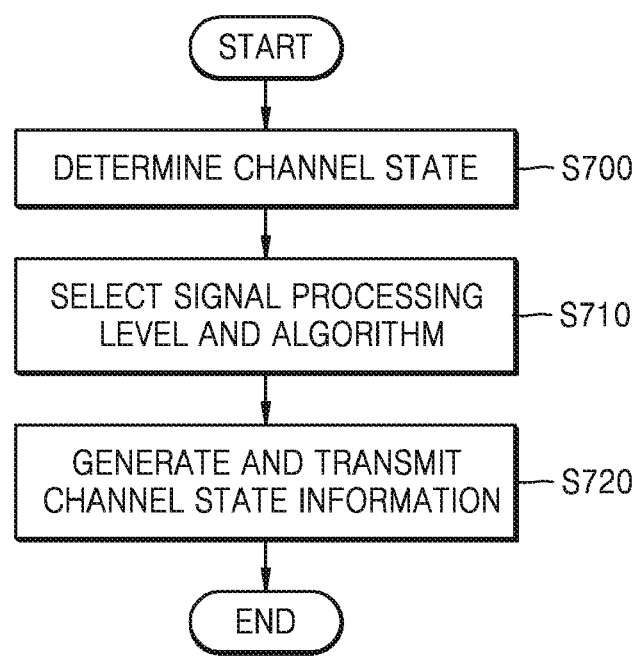
FIG. 15 is a flowchart illustrating an operation of a modem that generates channel state information CSI, according to some example embodiments.

FIG. 15 is a flowchart illustrating an operation of a modem that generates channel state information CSI, according to some example embodiments. FIG. 15 may illustrate, for example, an operation of the user equipment 100 shown in FIG. 1. Hereinafter, a description of FIG. 15 will be made with reference to FIG. 1.

Referring to FIG. 15, the user equipment 100 may determine a channel state for wireless communication (S700). Although the channel state may be determined, for example, based on the channel parameters collected from the plurality of transceivers 126-1 to 126-N, the inventive concepts are not limited thereto.

Next, the user equipment 100 may select a signal processing level and a signal processing algorithm for wireless communication, for each of the plurality of functional groups (for example, BLK-1 to BLK-M of FIG. 3) included in the modem 120 (S710). In some example embodiments, the user equipment 100 may adaptively select the signal processing level and the signal processing algorithm based on at least one of parameters associated with the user equipment 100 and/or parameters associated with wireless communication.

As an example, the user equipment 100 may adaptively select the signal processing level and the signal processing algorithm based on channel parameters of wireless communication. As another example, the user equipment 100 may adaptively select the signal processing level and the signal processing algorithm based on the performance index of the user equipment 100 and the performance threshold according thereto. As yet another example, the user equipment 100 may adaptively select the signal processing level and the signal processing algorithm based on the temperature of the user equipment 100 and whether heat generation should be alleviated according thereto. As yet another example, the user equipment 100 may adaptively select the signal processing level and the signal processing algorithm based on the total amount of available power of the power source included in the user equipment 100.

Next, the user equipment 100 may generate channel state information CSI and may transmit the channel state information CSI to the base station 10 (S720). The channel state information CSI may be a reference signal for transferring a channel state of the user equipment 100 to the base station 10. In some example embodiments, the user equipment 100 may generate the channel state information CSI further based on at least one of the selected signal processing level and the selected signal processing algorithm in addition to information on the channel state (e.g., information on at least one state of at least one of the plurality of channels). For example, the user equipment 100 may transfer information for operating adaptive signal processing to the base station 10 by generating the channel state information CSI further based on at least one of the selected signal processing level and the selected signal processing algorithm.

Figure 16A:
FIGS. 16A and 16B respectively illustrate examples of channel state information of FIG. 15.
Figure 16B:

FIGS. 16A and 16B respectively illustrate examples of the channel state information of FIG. 15.

Referring to FIG. 16A, a table TB3 including, as the channel state information CSI, a channel quality indicator CQI, a transmission scheme of a base station and a signal processing level (e.g., a channel quality signal processing level) is provided, where the transmission scheme of the base station and the signal processing level correspond to each index of the channel quality indicator CQI. The channel quality indicator CQI may refer to a maximum (or upper limit) data rate allowing the user equipment 100 to perform reception in a current channel state. As a modified example, the channel quality indicator CQI may be substituted with a signal-to-noise ratio, a maximum (or upper limit) error correction code rate and/or modulation scheme, a data efficiency per frequency, and/or the like, which may be utilized similarly to the maximum data rate.

The transmission scheme and the signal processing level that are usable by the user equipment 100 may vary with the index of the channel quality indicator CQI. For example, the user equipment 100 may be able to use a transmission scheme a and a signal processing level of 1 when the index of the channel quality indicator CQI is 1, and may be able to use a transmission scheme b and a signal processing level of 1 when the index of the channel quality indicator CQI is 2. Although only one signal processing level is shown as corresponding to each index of the channel quality indicator CQI in the table TB3 for convenience, separate signal processing levels for the respective functional blocks included in the modem 120 may be included in the table TB3, the separate signal processing levels corresponding to each channel quality indicator CQI.

The user equipment 100 may transmit, to the base station 10, the channel state information CSI that is based on the table TB3. For example, the base station 10 receiving the channel state information CSI may determine a transmission scheme in response thereto, and may perform wireless communication with the user equipment 100 based on the transmission scheme. In some example embodiments, the user equipment 100 may update the table TB3 by a plurality of wireless communications with the base station 10. For example, the user equipment 100 may learn a relation of the channel state information CSI to the transmission scheme and the signal processing level by wireless communication with the base station 10 based on a machine learning technique. The user equipment 100 may update data of the table TB3 based thereon.

Referring to FIG. 16B, a table TB4 including, as the channel state information CSI, a rank indicator RI, the transmission scheme of the base station and the signal processing level (e.g., a rank signal processing level) is provided, where the transmission scheme of the base station and the signal processing level correspond to each index of the rank indicator RI. The rank indicator RI may refer to the number of spatial layers allowing the user equipment 100 to perform reception in a current channel state. The transmission scheme and the signal processing level that are usable by the user equipment 100 may vary with the index of the rank indicator RI. In relation to this, repeated descriptions between FIG. 16A and FIG. 16B will be omitted.

Figure 17:
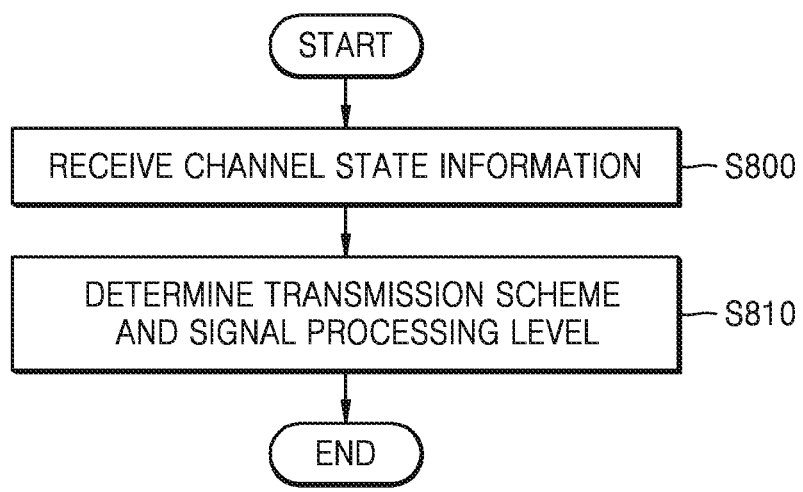
FIG. 17 is a flowchart illustrating an operation of a base station, according to some example embodiments.

FIG. 17 is a flowchart illustrating an operation of a base station, according to some example embodiments. Hereinafter, a description of FIG. 17 will be made with reference to FIG. 1.

Referring to FIG. 17, the base station 10 may receive the channel state information CSI from the user equipment 100 (S800). In some example embodiments, the base station 10 may receive the channel state information CSI reflecting the signal processing level and the signal processing algorithm that are selected by the user equipment 100. For example, the signal processing level and the signal processing algorithm may be selected by the user equipment 100 based on the channel parameters of wireless communication, the performance index of the user equipment 100 and/or the performance threshold according thereto, the temperature of the user equipment 100 and whether heat generation should be alleviated according thereto, the total amount of available power of the power source included in the user equipment 100, and/or the like.

Next, the base station 10 may determine a transmission scheme and a signal processing level for the user equipment 100 in response to the channel state information CSI (S810). For example, the base station 10 may determine the transmission scheme and the signal processing level that are requested by the user equipment 100 based on the channel state information CSI, or may determine the transmission scheme and the signal processing level independently of the request of the user equipment 100 by considering a relation to other user equipment. When the base station 10 determines the transmission scheme and the signal processing level that are requested by the user equipment 100 based on the channel state information CSI, the base station 10 and the user equipment 100, together, may perform adaptive signal processing that is based on various parameters of the user equipment 100.

The various operations of methods described above may be performed by any suitable means capable of performing the operations, such as various hardware and/or software implemented in some form of hardware (e.g., processor, ASIC, etc.).

The software may comprise an ordered listing of executable instructions for implementing logical functions, and can be embodied in any "processor-readable medium" for use by or in connection with an instruction execution system, apparatus, or device, such as a single or multiple-core processor or processor-containing system.

The blocks or operations of a method or algorithm and functions described in connection with the example embodiments disclosed herein may be embodied directly in hardware, in a software module executed by a processor, or in a combination of the two. If implemented in software, the functions may be stored on or transmitted over as one or more instructions or code on a tangible, non-transitory computer-readable medium. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD ROM, or any other form of storage medium known in the art.

While the inventive concepts have been particularly shown and described with reference to some example embodiments thereof, it will be understood by those skilled in the art that various changes in form and details may be made therein without departing from the spirit and scope of the following claims. In addition, it should be understood that particular terms used herein are only for the purpose of describing some example embodiments and are not intended to limit the inventive concepts. Therefore, the scope of the inventive concepts should be defined by the accompanying claims and equivalents thereof.

What is claimed is:

1. A device for performing wireless communication, the device comprising:
    a memory storing computer-readable instructions; and
    at least one processor configured to execute the computer-readable instructions to,
        generate a condition signal based on at least one parameter associated with the device or the wireless communication,
        determine a signal processing level for at least one of a plurality of signal processing functions based on the condition signal, and
        select at least one of a plurality of signal processing algorithms for performing the at least one of a plurality of signal processing functions based on the signal processing level, each of the plurality of signal processing functions being associated with the wireless communication, each of the plurality of signal processing algorithms having a different complexity level among a plurality of complexity levels, and the signal processing level corresponding to one of the plurality of complexity levels,
    wherein the determination of the signal processing level is based on the condition signal and a transmission-related factor comprising a transmission speed, a transmission mode, and a transmission scheme of the wireless communication, and
    wherein the different complexity level is different with respect to a number of logic blocks.

2. The device according to claim 1, wherein
    the at least one of the plurality of signal processing algorithms includes at least one of a first signal processing algorithm among the plurality of signal processing algorithms or a second signal processing algorithm among the plurality of signal processing algorithms.

3. The device according to claim 1, further comprising:
    one or more transceivers configured to at least one of transmit or receive wireless signals for the wireless communication via one or more antennae,
    wherein the at least one processor is configured to execute the computer-readable instructions to determine one or more channel parameters for a channel used for the wireless communication based on data received from the one or more transceivers.

4. The device according to claim 3, wherein the one or more channel parameters include at least one of a correlation between a base station and the one or more antennae, a signal-to-noise ratio, a signal-to-interference-plus-noise ratio, one or more Doppler characteristics of the device, one or more delay characteristics, one or more maximum or minimum delay paths, a number of time dominant paths, a number of spatially dominant paths, or one or more angular characteristics.

5. The device according to claim 4, wherein
    the plurality of signal processing functions include a first signal processing function of performing estimation of the channel, and
    the selection of the at least one of the plurality of signal processing algorithms for performing the first signal processing function is based on at least one of the correlation, the one or more Doppler characteristics, the one or more maximum or minimum delay paths, the one or more delay characteristics, or the number of time dominant paths.

6. The device according to claim 4, wherein the plurality of signal processing functions comprise a second signal processing function of performing beamforming for the wireless communication, and
    the selection of the at least one of the plurality of signal processing algorithms for performing the second signal processing function is based on at least one of the number of spatially dominant paths or the one or more angular characteristics.

7. The device according to claim 4, wherein the plurality of signal processing functions comprise a third signal processing function of performing at least one of processing or detection of signals via a plurality of antennae, and the selection of the at least one of the plurality of signal processing algorithms for performing the third signal processing function is based on at least one of the correlation, the signal-to-noise ratio, or the signal-to-interference-plus-noise ratio.

8. The device according to claim 1, wherein
the at least one parameter includes a performance index of the device,
the condition signal is generated according to a performance threshold selected based on the performance index, and
the at least one processor is configured to execute the computer-readable instructions to select the at least one of the plurality of signal processing functions from among the plurality of signal processing functions in response to the condition signal, the at least one of the plurality of signal processing functions exceeding the performance threshold.

9. The device according to claim 1, wherein
the at least one parameter includes a temperature of the device,
the condition signal is generated according to whether the temperature of the device exceeds one or more temperature thresholds, and
the at least one processor is configured to execute the computer-readable instructions to select the at least one of the plurality of signal processing functions from among the plurality of signal processing functions in response to the condition signal, the at least one of the plurality of signal processing functions being downgrade-target signal processing functions.

10. The device according to claim 1, wherein
the at least one parameter includes power information associated with at least one power source supplying power to the device,
the condition signal is generated according to a total amount of available power estimated based on the power information,
the at least one processor is configured to execute the computer-readable instructions to allocate the total amount of available power to the at least one of the plurality of signal processing functions based on the condition signal, and
the selection of the at least one of the plurality of signal processing algorithms is based on the allocation.

11. A device for performing wireless communication with a base station via a plurality of channels, the device comprising:
a memory storing computer-readable instructions; and
at least one processor configured to execute the computer-readable instructions to,
generate a condition signal based on at least one parameter associated with the plurality of channels or the device,
select a first signal processing level for a first signal processing function among a plurality of signal processing functions in response to the condition signal, each of the plurality of signal processing functions being associated with the wireless communication, and
select a first signal processing algorithm among a plurality of signal processing algorithms for performing the first signal processing function based on the first signal processing level, each of the plurality of signal processing algorithms having a different complexity level among a plurality of complexity levels, and the first signal processing level corresponding to one of the plurality of complexity levels, wherein
the at least one processor is configured to execute the computer-readable instructions to select a second signal processing level for a second signal processing function among the plurality of signal processing functions,
the selection of the first signal processing algorithm is based on the first signal processing level and a correlation between the first signal processing function and the second signal processing function,
the at least one processor is configured to select the first signal processing level based on the condition signal and a transmission-related factor comprising a transmission speed, a transmission mode, and a transmission scheme of the wireless communication, and
the different complexity level is different with respect to a number of logic blocks.

12. The device according to claim 11, wherein the at least one processor is configured to execute the computer-readable instructions to generate channel state information for transmission to the base station based on one or more parameters among the at least one parameter associated with the plurality of channels, the first signal processing level, and the first signal processing algorithm.

13. A method performed by a device for wireless communication with a base station via a plurality of channels, the method comprising:
selecting at least one signal processing level for at least one of a plurality of signal processing functions based on at least one parameter, each of the plurality of signal processing functions being associated with the wireless communication; and
selecting at least one signal processing algorithm from among a plurality of signal processing algorithms for the at least one of the plurality of signal processing functions based on the at least one signal processing level, each of the plurality of signal processing algorithms having a different complexity level among a plurality of complexity levels, and the at least one signal processing level corresponding to at least one of the plurality of complexity levels, wherein
the method further comprises,
receiving a capability inquiry signal from the base station, and
sending capability information comprising a continuous signal processing time of the device to the base station in response to the capability inquiry signal, and the capability information includes an on idle time subsequent to the continuous signal processing time,
the selecting the at least one signal processing level is based on the least one parameter and a transmission-related factor comprising a transmission speed, a transmission mode, and a transmission scheme of the wireless communication, and
the different complexity level is different with respect to a number of logic blocks.

14. The method according to claim 13, further comprising:
determining at least one state of at least one of the plurality of channels;

generating channel state information based on the at least one state of at least one of the plurality of channels, the at least one signal processing level, and the at least one signal processing algorithm; and sending the channel state information to the base station.

15. The method according to claim 14, wherein the channel state information comprises a channel quality indicator of the device, a transmission scheme corresponding to the channel quality indicator, and a channel quality signal processing level corresponding to the channel quality indicator.

16. The method according to claim 14, wherein the channel state information comprises a rank indicator of the device, a transmission scheme corresponding to the rank indicator, and a rank signal processing level corresponding to the rank indicator.

* * * * *